US005921534A

United States Patent [19]

Swann et al.

[11] Patent Number: 5,921,534

[45] Date of Patent: Jul. 13, 1999

[54] DETACHABLE JAW FOR VISE-LIKE WORKHOLDING APPARATUS

[75] Inventors: George R. Swann, Gibsonia; Eric R. Moore, Pittsburgh; Edward S. Paris, Allison Park, all of Pa.

[73] Assignee: Chick Workholding Solutions, Inc., Warrendale, Pa.

[21] Appl. No.: 08/888,035

[22] Filed: Jul. 3, 1997

[51] Int. Cl.$^{6}$ .......... B23Q 3/06

[52] U.S. Cl. .......... 269/136; 269/134; 269/244; 269/284; 269/283

[58] Field of Search .......... 269/134, 136, 269/138, 244, 242, 279, 280, 283, 284, 309

[56] References Cited

U.S. PATENT DOCUMENTS

| | | | |
|---|---|---|---|
| 463,332 | 11/1891 | Giles . | |
| 2,564,138 | 8/1951 | Walker . | |
| 2,570,857 | 10/1951 | Purpura . | |
| 2,880,638 | 4/1959 | Mugglie et al. . | |
| 3,403,901 | 10/1968 | Servadia | 269/284 |
| 3,514,092 | 5/1970 | Lassy . | |
| 4,043,547 | 8/1977 | Glomb et al. . | |
| 4,098,500 | 7/1978 | Lenz . | |
| 4,205,833 | 6/1980 | Lenz . | |
| 4,221,369 | 9/1980 | Takasugi | 269/138 |
| 4,684,115 | 8/1987 | Krause . | |
| 4,738,438 | 4/1988 | Horie et al. . | |
| 4,813,310 | 3/1989 | Moynihan | 269/284 |
| 4,881,727 | 11/1989 | Nemirovsky | 269/309 |
| 4,898,371 | 2/1990 | Mills et al. . | |
| 4,928,937 | 5/1990 | Bernstein . | |
| 4,934,674 | 6/1990 | Bernstein . | |
| 4,971,301 | 11/1990 | Yang . | |
| 5,015,003 | 5/1991 | Ramunas | 269/284 |
| 5,024,427 | 6/1991 | Swann . | |
| 5,033,724 | 7/1991 | James . | |
| 5,098,073 | 3/1992 | Lenz . | |
| 5,163,662 | 11/1992 | Bernstein | 269/138 |
| 5,193,792 | 3/1993 | DiMarco . | |
| 5,242,159 | 9/1993 | Bernstein . | |
| 5,374,041 | 12/1994 | Bernstein . | |
| 5,458,321 | 10/1995 | Durfee, Jr. . | |
| 5,623,757 | 4/1997 | Durfee | 269/136 |
| 5,649,694 | 7/1997 | Buck | 269/283 |
| 5,720,476 | 2/1998 | Swann et al. | 269/136 |

FOREIGN PATENT DOCUMENTS

| | | |
|---|---|---|
| 0 215 326 A2 | 8/1986 | Germany . |
| 39 29512 A1 | 3/1991 | Germany . |
| WO 89/11950 | 12/1989 | WIPO . |

*Primary Examiner*—Robert C. Watson
*Attorney, Agent, or Firm*—Kirkpatrick & Lockhart LLP

[57] ABSTRACT

A removable jaw assembly for a workholding apparatus having a base that defines a worksurface and a first longitudinal axis. The assembly includes an tower portion provided on the workholding apparatus that protrudes above the worksurface and defines a second longitudinal axis that is substantially parallel to the first longitudinal axis. The assembly also includes a removable jaw member that has a cavity that is sized to receive the tower portion therein such that the jaw member may be selectively longitudinally moved on the tower portion between a released position and an attached position. The tower portion includes at least one spring-biased latch member adapted to engage an engagement area formed in a wall of the cavity at right angles to the second longitudinal axis to selectively retain the removable jaw on the tower portion. In addition, an angled retaining surface is provided in the tower portion transverse to the second longitudinal axis and is adapted to selectively engage a corresponding groove in the removable jaw member when it is in the attached position.

47 Claims, 16 Drawing Sheets

DETACHABLE JAW FOR VISE-LIKE WORKHOLDING APPARATUS

CROSS REFERENCE TO RELATED APPLICATIONS

Not Applicable.

FEDERALLY SPONSORED RESEARCH

Not Applicable.

BACKGROUND OF THE INVENTION

1. Field of the Invention

The present invention relates to workholding apparatuses and, more particularly, is directed to removable jaws for vise-like workholders.

2. Description of the Invention Background

During the machining of a "workpiece" on a machine tool apparatus such as a milling machine or the like, single or multiple workpieces are typically held in place by a precision vise or clamping member ("a vise-like workholder") that is attached to the machine. Exemplary vise-like workholders that are adapted to hold a single workpiece are disclosed in U.S. Pat. No. 4,928,937 to Bernstein, U.S. Pat. No. 4,898,371 to Mills et al., U.S. Pat. No. 4,569,509 to Good, and U.S. Pat. No. 4,098,500 to Lenz.

As can be gleaned from review of those patents, such vise-like workholders are adapted to clamp a workpiece between opposing jaw members operably supported on a base. Typically, one jaw member is fixed and the other jaw member is movable relative to the fixed jaw member by means of a screw member housed within the base. As the movable jaw member is moved toward the fixed jaw member, the workpiece is clamped therebetween.

Another vise-like workholder is disclosed in U.S. Pat. No. 2,564,138 to Walker. This workholder includes jaw support members that each have a camming portion that is adapted to engage a corresponding undercut portion provided on a jaw member. The rear portion of each jaw member is also provided with a transverse slot that is adapted to receive a transverse bar formed in a corresponding jaw support member. A second transverse slot is provided in the front portion of each jaw member for receiving a corresponding spring strip that is attached to the forward portion of the jaw member. The spring strip serves to bias the jaw member in a slightly upward direction relative to the jaw support member. This jaw member arrangement, however, is less desirable because debris can accumulate in the exposed slot and become lodged between the jaw support member and the jaw member as the support member is advanced on the vise base.

Other vise-like workholders are capable of holding two or more workpieces in side-by-side orientations. Examples of such "two-station" workholders are disclosed in U.S. Pat. No. 5,098,073 to Lenz, U.S. Pat. No. 5,094,436 to Stephan, III, U.S. Pat. No. 5,022,636 to Swann, U.S. Pat. No. 4,934,674 to Bernstein, and U.S. Pat. No. 4,529,183 to Krason et al. Such workholders typically comprise a base that has a central jaw member fixed thereto. Two outer jaw members are operably supported on the base and can be selectively positioned relative to the fixed central jaw member by a vise screw that is operably received in a longitudinal cavity provided in the base.

The workpiece or workpieces are typically supported on the workholder bases of each of the above-mentioned workholders and are secured in position by at least two jaw members. Prior jaw member arrangements typically employed hardened steel jaw plates that were removably attached to a jaw member that was movably supported on the base. Steps were often machined in the jaw plates to accommodate workpieces of different heights. However, the number of different workpiece configurations that could be clamped utilizing such system were generally limited to shapes with at least one straight side.

One type of workholder equipped with a removable jaw member is disclosed in U.S. Pat. No. 463,332 to Giles. The removable jaw member employed by this workholding device has a socket formed therein with undercut portions adapted to receive a support member having beveled edges. To attach the jaw member to the support member, the beveled portion of the support member is aligned with the jaw member socket such that it can be inserted therein. Thereafter, the jaw member is rotated ninety degrees causing the beveled edges of the support member to engage the corresponding undercut portions of the jaw member socket. Because the socket occupies a large portion of the jaw member, this removable jaw member is ill-suited to have workpiece retaining grooves or cavities machined in its upper surface due to the relatively small amount of material provided between the top of the jaw member and the support member socket.

Another workholding device that employs a removable jaw member is disclosed in U.S. Pat. No. 2,880,638 to Muggli et al. This removable jaw member arrangement includes a jaw "nut" or support member that is adapted to support the removable jaw member on a vise base. The removable jaw member has a cavity formed therein that is adapted to receive a portion of the jaw nut that protrudes above the work surface of the vise base. The cavity and the jaw nut have corresponding sloping surfaces that are designed to receive a hardened semi-spherical insert positioned therebetween. The insert is retained in that position by an adjusting screw that extends through the rear portion of the jaw member to engage a flat surface on the rear of the jaw nut. This arrangement requires the use of hand tools to change the removable jaw member and the retaining screw is susceptible to being loosened during the machining process. In addition, there is not sufficient material between the upper surface of the jaw member and the cavity to accommodate grooves or retaining cavities in the top of the removable jaw member.

U.S. Pat. No. 4,928,937 to Bernstein also discloses a machine vise that has a fixed jaw member and a movable jaw member. The movable jaw member is removably attached to a movable support member in the manner taught in U.S. Pat. No. 2,880,638 to Muggli et al. However, the Bernstein patent teaches that the set screw can be replaced with a spring-biased detent that is designed to engage a cam surface on the movable support member to retain the jaw member on the support member. The detent also serves to urge the jaw member into sliding contact with the base. However, due to the relatively small amount of material between the upper surface of the jaw member and the cavity therein, such jaw member attachment arrangement is ill-suited for use in applications wherein it is desirable to machine workpiece retaining grooves or cavities in the upper surface of the jaw member. In addition, each jaw member must be fitted with a spring-loaded detent.

Another detachable jaw member arrangement for a vise-like workholding apparatus is disclosed in U.S. Pat. No. 5,024,427 to Swann. This device utilizes a removable pin arrangement for attaching a removable jaw member to a jaw nut. Such pin arrangement, however, requires the jaw nut to have a relatively high portion protruding into the jaw member rendering that portion of the jaw member unavailable to have workpiece retaining grooves, etc. machined therein.

Yet another workholding device with detachable jaw members is disclosed in U.S. Pat. No. 5,458,321 to Durfee, Jr. The device disclosed in this patent includes a movable jaw support member that is operably supported within a groove in a vise base. A portion of the support member protrudes from the groove in the base and has a transverse groove in one end thereof and a spring biased retaining pin which protrudes from the opposite end thereof along an axis that is perpendicular to the transverse groove. A cavity is provided in the removable jaw member that is sized to receive the movable jaw support member therein. Two transverse pins are provided in the jaw member and are each arranged to engage the transverse groove in the movable support member depending upon the orientation by which the jaw member is positioned on the support member. A shallow groove or undercut is also provided in the jaw member directly below each transverse pin. To attach the jaw member to the support member, the jaw member is placed over the support member such that one of the transverse pins engages the transverse groove therein. Thereafter, the jaw member is pivotally pressed onto the support member such that the spring biased retaining pin engages a corresponding undercut portion located in the jaw member. Thus, the jaw member is removably secured to the movable member by virtue of the engagement between one of the transverse pins and the transverse groove in the support member and the retaining pin's engagement with one of the undercut portions in the jaw member. This jaw member arrangement, however, is expensive to fabricate because each jaw member must be equipped with transverse pins. In addition, the transverse pins limit the amount of jaw member material that can be removed from the upper surface of the jaw member to accommodate various workpieces. Furthermore, the jaw cannot be installed or removed by vertical movement and, indeed, the user must utilize a prybar-like tool to remove the jaw from the support member. Thus, if such a tool is misplaced or lost, valuable machining time may be lost during changeover operations.

Accordingly, there is a need for a removable jaw member for a vise-like workholder that is economical to fabricate.

There is a further need for a removable jaw member having the above-mentioned attributes that can also accommodate cavities and grooves machined in its upper surface and clamping surfaces to enable the jaw member to clamp workpieces having irregular shapes.

There is yet another need for a detachable jaw for a vise-like apparatus that can be attached and removed from the apparatus without the use of additional tools.

There is still another need for a detachable jaw for a vise-like workholding apparatus that lends itself to automated attachment and detachment to the apparatus without the use of additional tools.

Another need exists for a vise-like workholding apparatus that includes removable jaws that can have grooves and cavities machined in their upper surface and that can be easily attached and detached from the apparatus.

SUMMARY OF THE INVENTION

In accordance with a particular preferred form of the present invention, there is provided a removable jaw assembly for use in connection with a vise-like workholder that has a base that defines a worksurface. The removable jaw assembly comprises a tower portion on the workholding apparatus that protrudes above the worksurface and has a longitudinal axis. The preferred assembly also includes a removable jaw member that has a cavity therein sized to receive the tower portion therein such that the jaw member may be selectively longitudinally moved on the tower portion between a released position and an attached position. The tower portion also preferably has at least one retainer therein that is adapted to engage an engagement area formed in a wall of the cavity at right angles to the longitudinal axis when the tower portion is received in the cavity. Preferably, the engagement area includes first and second cavities that correspond with each retainer such that when the jaw member is in the released position, the retainer engages a first cavity and when the jaw member is moved to the attached position, the retainer engages a second cavity that is sized and oriented to cooperate with the retainer to retain the jaw member on the tower portion and preferably bias the jaw member onto the worksurface. In addition, the tower portion preferably has an angled retaining surface that extends along an axis that is substantially transverse to the longitudinal axis and is adapted to cooperate with at least one groove provided in the jaw member to attach the jaw member to the tower portion in at least one clamping position. In another embodiment, two grooves are provided in the cavity to enable the jaw member to be attached to the tower portion in two clamping positions.

Thus, it is an object of the present invention to provide a relatively inexpensive removable jaw assembly that can be used in connection with a vise-like workholder.

It is another object of the present invention to provide a removable jaw assembly that can be easily attached and detached from the workholder by manual and automatic means, if desired.

Yet another object of the present invention is to provide a removable jaw assembly in which various workpiece-compatible cavities and grooves may be machined therein.

Accordingly, the present invention provides solutions to the problems discussed above. In particular, the present removable jaw assemblies can be easily manually attached to and detached from movable support members operably supported in a workholder base. Therefore, the subject removable jaw assembly addresses a number of problems commonly encountered when using other known workholder jaw arrangements. These and other details, objects and advantages will become further apparent as the following detailed description of the present preferred embodiment thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF PREFERRED EMBODIMENTS

Figure 1:
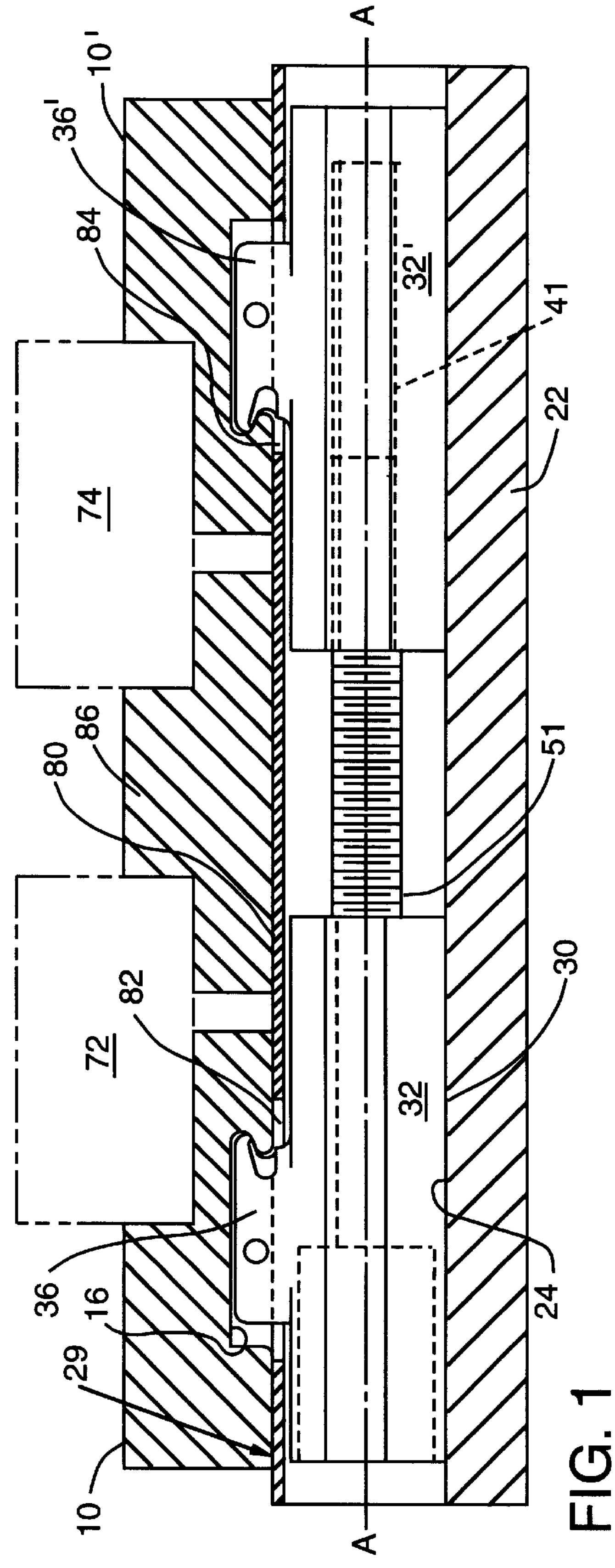
FIG. 1 is a partial cross-sectional elevational view of a preferred vise-like workholding apparatus having two removable jaw members of the present invention attached thereto.

Referring now to the drawings for the purposes of illustrating present preferred embodiments of the invention only and not for purposes of limiting the same, FIG. 1 illustrates preferred removable jaw members (10, 10') of the present invention received on the base 22 of a vise-like workholder 20. The basic structure of the workholder 20 is similar to the workholding apparatus described in U.S. Pat. No. 5,022,636, issued Jun. 11, 1991 to George R. Swann, entitled "Workholding Apparatus", the disclosure of which is herein incorporated by reference. As such, in the present "Detailed Description Of Preferred Embodiments", the basic structure of the workholder 20 will be described in general terms, it being understood that the particular details of the workholder 20 construction, with the exception of those features which are described hereinbelow forming these embodiments of the present invention, may be gleaned from a review of that patent. In addition, the skilled artisan will readily appreciate that the workholders described herein are provided as examples of the types of workholders with which the removable jaw member embodiments of the present invention may be used. As such, the particular construction of the inventions described herein should not be construed to limit the breadth of protection afforded to the present embodiments described herein and recited in the claims hereof.

Figure 2:
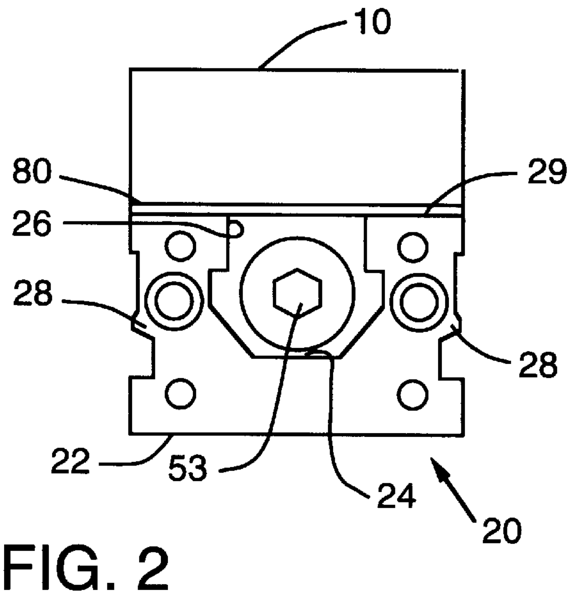
FIG. 2 is a left end elevational view of the device depicted in FIG. 1.

The vise-like workholder 20 generally comprises a base member 22 which is an elongated metallic structure typically fabricated from high strength aluminum or steel material. As can be seen from reference to FIGS. 1 and 2, a cavity 24 is machined along the longitudinal axis "A—A" of the base member 22 and defines a longitudinal slot 26 having two longitudinally extending side rail members 28. In addition, a clamping assembly, generally designated as 30, is provided for selective movement within the cavity 24 in the base member 22. The clamping assembly 30 includes a first movable support member 32 and a second movable support member 32' which are each slidably received within the cavity 24. As shown in FIGS. 1 and 2, a first jaw member 10 is preferably removably attached to the first movable support member 32 and a second jaw member 10' is preferably removably attached to the second movable support member 32'.

The clamping assembly 30 also includes a screw shaft 51 that is received within the cavity 24 in the base member 22. One end of the screw shaft 51 is provided with threads which are intended to engage a threaded bore 41 within the second movable support member 32'. In addition, the screw shaft 51 includes means (not shown) for engaging and displacing the first movable support member 32. The screw shaft 51 passes through the first movable support member 32 and has a socket 53 therein for facilitating the application of rotary motion to the screw shaft 51.

A center jaw member 86 may also be attached to the base 22 between the first and second movable support members (32, 32') preferably by capscrews (not shown). See FIG. 1. However, other fastening methods may also be used to attach the center jaw member 86 to the base 22.

As can be seen in FIG. 1, the center jaw member 86 is preferably arranged on base 22 such that the first and second movable support members (32, 32') may move toward and away from the center jaw member 86 to clamp and unclamp workpieces 72 and 74 between the center jaw member 86 and first and second jaw members (10, 10'). For example, when the screw shaft 51 is rotated clockwise, the first movable support member 32 is moved relative to the center jaw member 86, thereby causing the first jaw member 10 to move toward the center jaw member 86 to clamp a first workpiece 72 therebetween. In addition, the clockwise rotation of the screw shaft 51 causes the second movable support member 32' to move toward the center jaw member 86 to clamp a second workpiece 74 between the jaw members (86, 10').

As can be seen in FIG. 2, the side rail members 28 of the workholder base 22 define a planar worksurface (that has a slot 26 extending the length thereof), generally designated as 29. In this embodiment, a shield 80 of the type disclosed in U.S. Pat. No. 5,442,844, issued on Aug. 22, 1995, entitled "Apparatus For Protecting the Internal Elements of a Workholding Apparatus", the disclosure of which is also incorporated herein by reference, is utilized between jaws (10, 86, 10') and the vise base 22 to prevent debris from accumulating in the slot 26 and/or cavity 24. As can be seen in FIG. 1, a preferred debris shield 80 has a first longitudinal opening 82 therein for receiving a portion of movable support member 32 therethrough. Similarly, shield 80 also has a second longitudinal opening 84 for receiving a portion of the movable support member 32' therethrough. While the use of shield 80 is preferred, the skilled artisan will appreciate that the subject invention can function equally well on workholding apparatuses that do not employ such a shield.

The construction of a preferred first movable support member 32 and corresponding first removable jaw member 10 will now be described in detail, with it being understood that the second movable jaw member 10' and the second movable support member 32', respectively, are preferably constructed in the same manner. Referring now to FIGS. 2–6, a preferred first movable support member 32 has a longitudinally extending body portion 34 that is adapted to be slidably received within the slot 26 of the vise base 22. As can also be seen in FIGS. 1, 4 and 5, the movable support member 32 has an attachment portion or tower 36 that is adapted to protrude above the planar worksurface 29.

Figure 3:
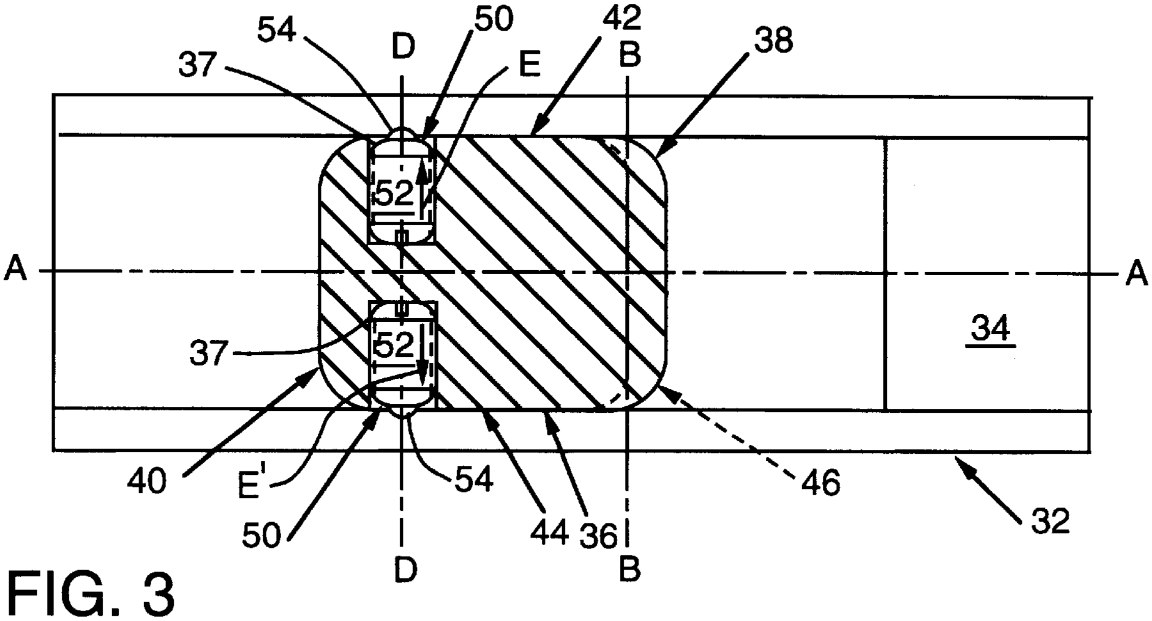
FIG. 3 is a plan view of a preferred movable support member of the present invention.

As shown in FIG. 3, in a preferred embodiment of the present invention, the tower 36 has a first end 38, a second end 40 and two lateral sides (42, 44). The body portion 34 has a longitudinal axis A'—A' that extends therethrough. The skilled artisan will readily appreciate that the axes described herein are used for reference purposes only to describe preferred interrelationships of various elements of the present invention. Preferably, the first and second ends (38, 40) of the tower portion 36 are substantially transverse to the axis A'—A' and lateral sides (42, 44) are substantially parallel to axis A'—A'. A retaining surface 46 is machined in the first end 38 of the tower 36 along axis B—B that is substantially transverse to axis A'—A'. See FIG. 3. In a preferred embodiment, the retaining surface 46 is an undercut area provided at an approximate 45° angle (angle "C" in FIG. 4) relative to the planar worksurface 29. Those of ordinary skill in the art will appreciate that other retaining features could also be successfully employed.

Also in a preferred embodiment, at least one and preferably two spring-biased latch members 50 are mounted within the tower portion 36 of a support member 32 with one latch member 50 being disposed in side 42 and one in side 44. In the preferred embodiment depicted in FIG. 3, two opposing spring-biased latch members 50 are mounted in tower 36 such that they are coaxially aligned along axis D—D that is substantially transverse to axis A'—A' and substantially parallel to axis B—B. Preferably, each spring-biased latch member 50 comprises a commercially available spring-loaded ball plunger assembly that includes a housing member 52 that is adapted to be threaded into a corresponding threaded bore 37 in tower 36. Each housing member 52 contains a spring (not shown) that biases a retaining ball 54 in the direction represented by arrows ("E", "E'") in FIG. 3.

Figure 4:
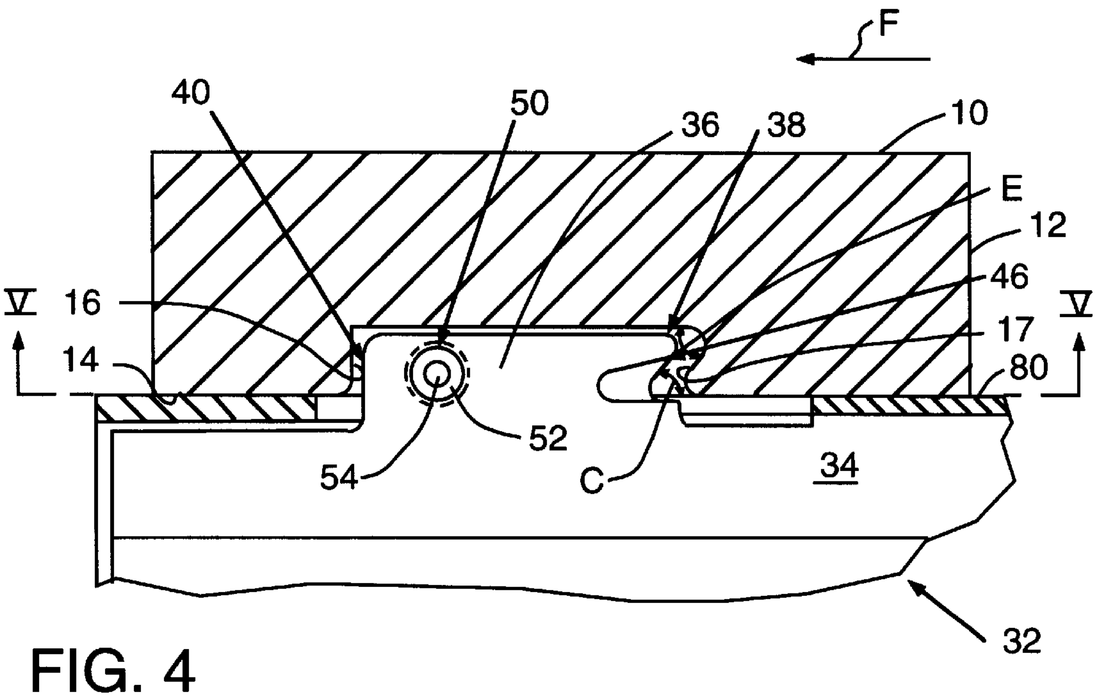
FIG. 4 is a partial side elevational view of a preferred jaw member shown in cross-section in a first released position on the preferred support member depicted in FIG. 3.
Figure 5:
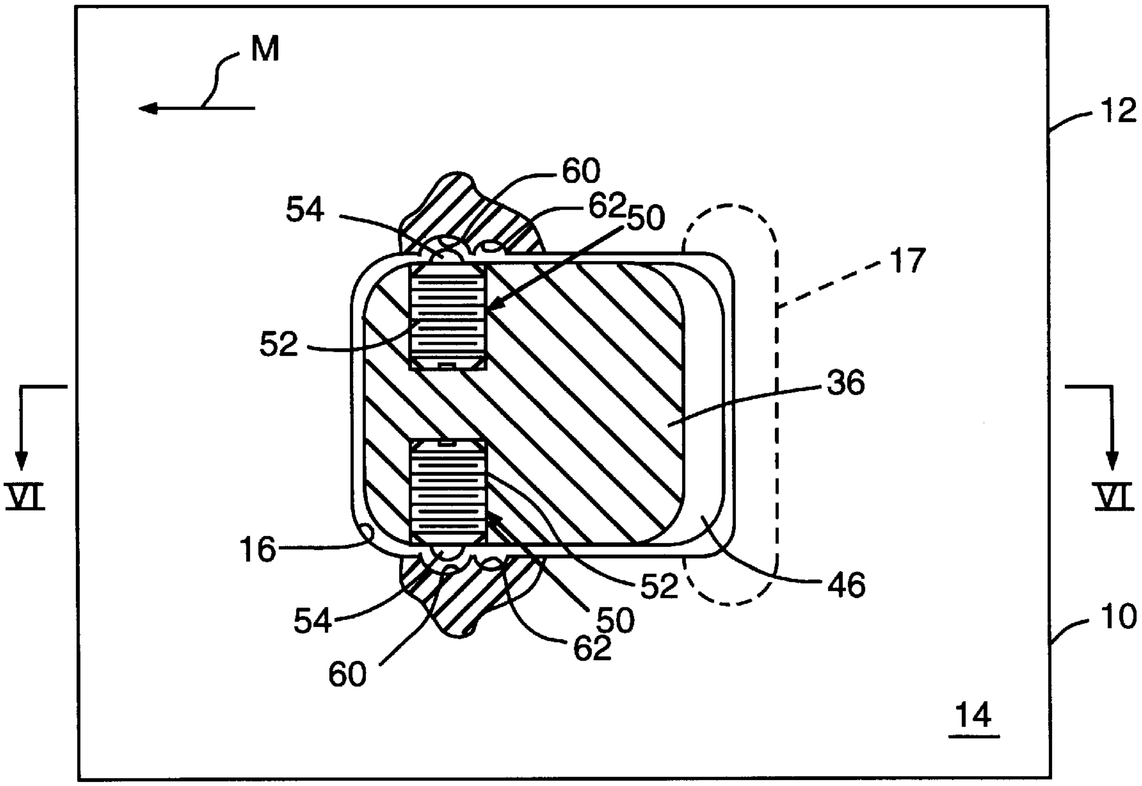
FIG. 5 is a partial sectional view of the jaw member of FIG. 4 in a released position on the support member.
Figure 6:
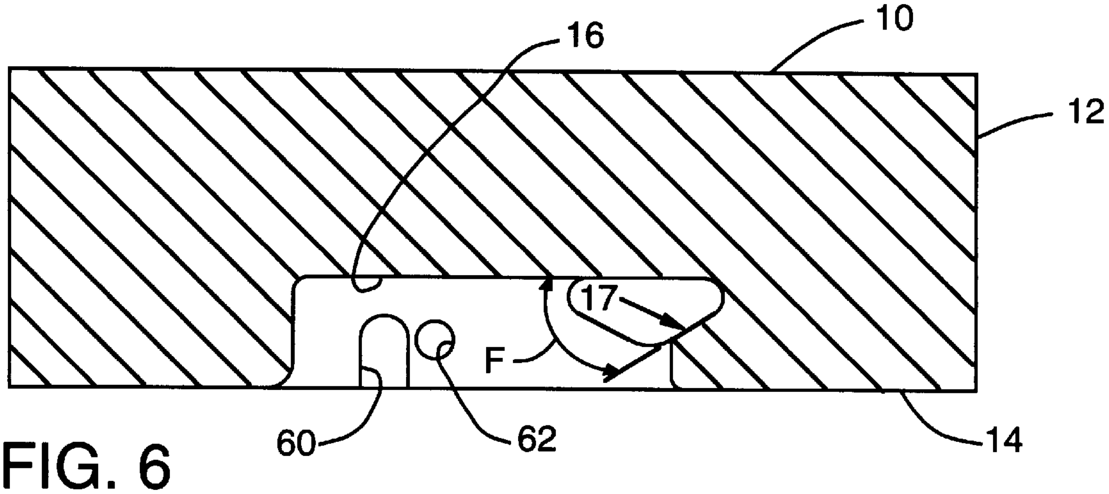
FIG. 6 is a partial cross-sectional view of the jaw member of FIG. 5 taken along line VI—VI in FIG. 5.

In a preferred embodiment, jaw member 10 is fabricated from aluminum; however, jaw member 10 may be fabricated from a variety of other suitable materials such as steel and the like. As can be seen in FIGS. 4–6, jaw member 10 has a clamping surface 12 and a bottom surface 14 that is adapted to slidably move on the shield 80 (if employed) or the worksurface 29 of the base 22. In a preferred embodiment, a cavity 16 that is sized to receive the tower portion 36 of the support member 32 therein is provided in the bottom surface 14 of the jaw 10. One end of the cavity 16 has an undercut groove 17 machined therein that is adapted to selectively mate with the angled retaining surface 46 machined in the tower portion 36 of the support member 32. The skilled artisan will appreciate that the undercut groove 17 is machined at an angle "F" relative to the bottom surface 14 of the jaw 10 that is substantially equal to angle "C" of the retaining surface 46 of the tower 36. See FIG. 6.

Figure 8:
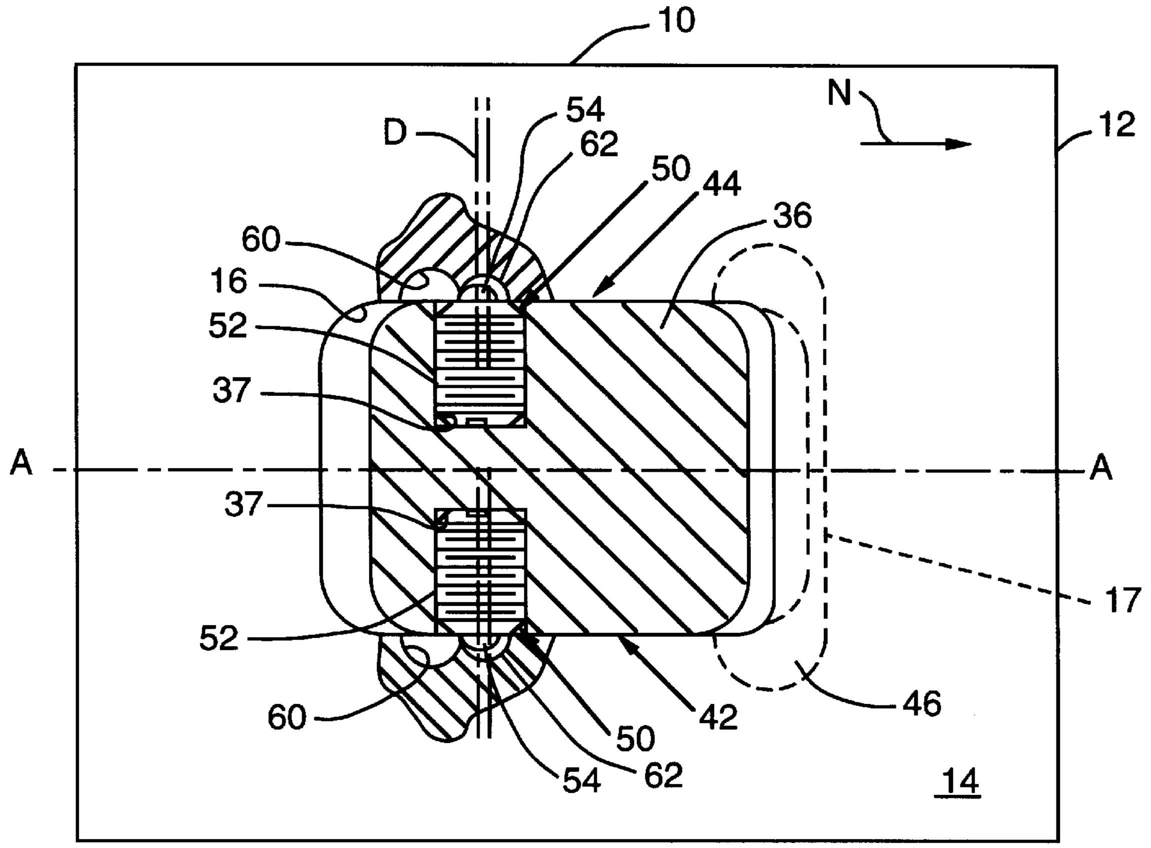
FIG. 8 is a partial sectional view of the jaw member and support member of FIG. 7 taken along line VIII—VIII in FIG. 7.

As can be seen in FIGS. 5, 6 and 8, each lateral side of the cavity 16 has a groove 60 and dimple 62 machined therein. In a preferred embodiment, groove 60 has a radius of 4 mm and is 2 mm deep at its center. Also, dimple 62 preferably has a radius of 4 mm and is 2 mm deep. We believe that these dimensions work well with a ball plunger 54 having a ball of 7 mm in diameter. As the present Detailed Description Proceeds, those of ordinary skill in the art will appreciate that the sizes and orientations of the grooves 60 and dimples 62 are dependent upon the size and orientations of the ball 54 of the spring-biased latch members 50 mounted in the tower 36.

Figure 7:
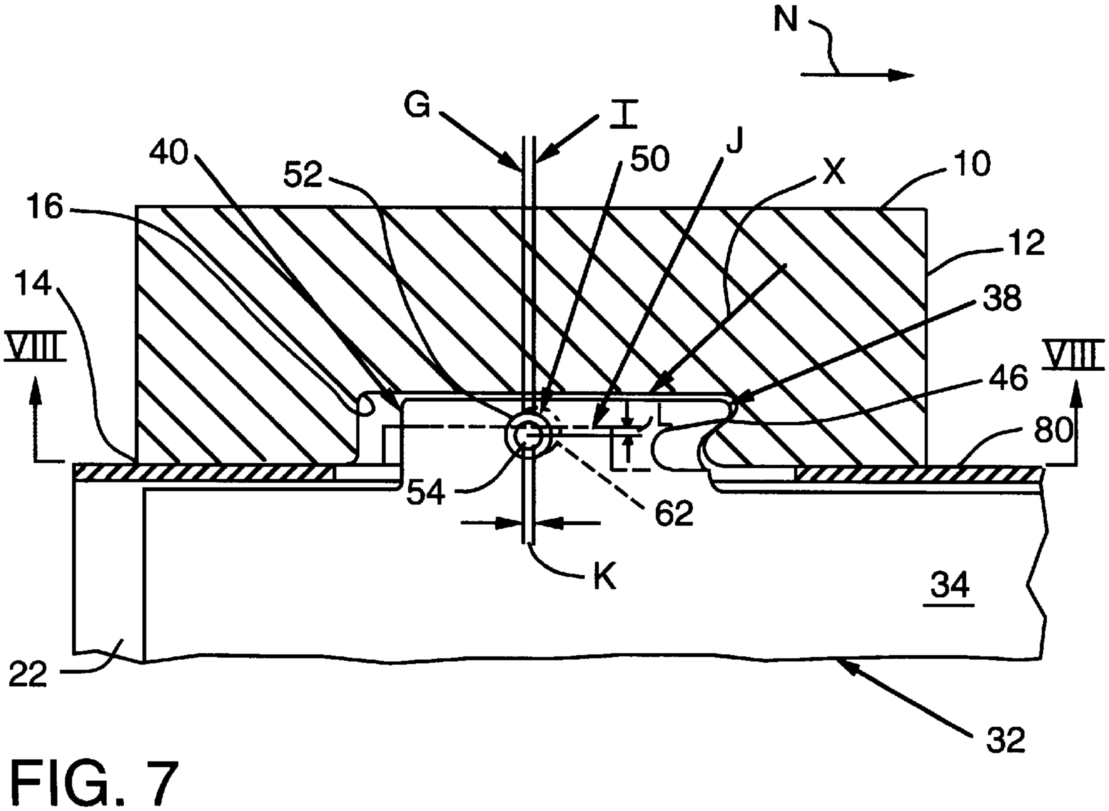
FIG. 7 is a partial side elevational view of another preferred jaw member attached to another preferred support member with the jaw member shown in cross-section.

FIG. 7 illustrates a preferred orientation of dimple 62 (dimple 62 is depicted by a phantom line) relative to the ball of ball plunger 54. For explanatory purposes, the vertically extending centerline of the ball of the ball plunger 54 is designated by "G", while the horizontally extending centerline is designated by "H". The vertically extending centerline of the dimple 62 is designated by "I" and the horizontally extending centerline is designated by "J". In a preferred embodiment, the distance "K" between the vertically extending centerlines (G, I) is approximately 1 mm and the distance "L" between the horizontally extending centerlines (H, J) is approximately 1 mm. Those of ordinary skill in the art will understand that such orientation of the dimple 62 relative to the ball of the ball plunger 54 will result in the jaw member 10 being urged downward onto the shield 80 (if employed) or the planar worksurface 29. Such downward force is represented by arrow "X" in FIG. 7 and serves to retain the undercut groove 17 of the jaw member 10 in engagement with the angled retaining surface 46 of the tower 36 and also serves to prevent infiltration of debris between the jaw member 10 and the shield 80 or the rails 28.

Figure 9:
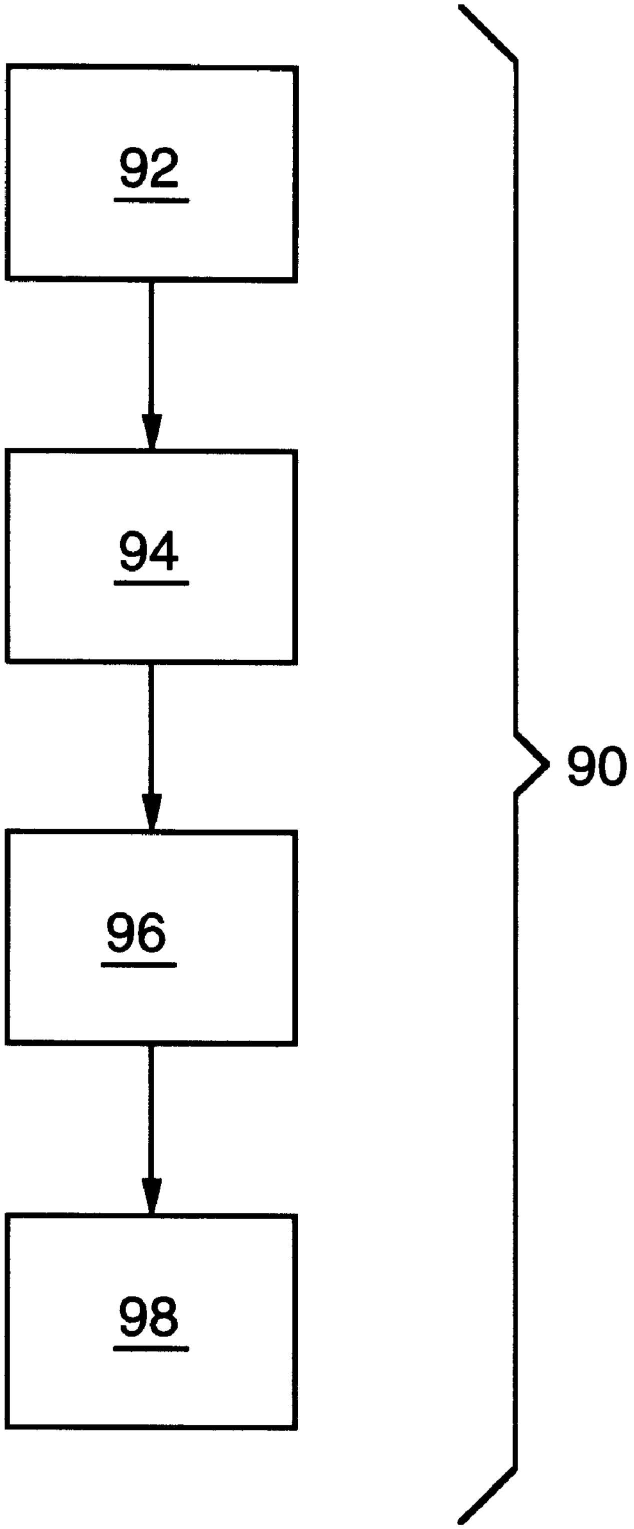
FIG. 9 is a diagram of a preferred method of the present invention.

FIG. 9 is a flow chart describing the method 90 of the present invention for attaching and detaching a jaw member 10 of the present invention to the workholding apparatus 20. FIGS. 4 and 5 illustrate a jaw 10 received on a corresponding tower 36 in a detached position. The reader will appreciate that the cavity 16 in the jaw 10 is sized such that the jaw may be placed vertically over the tower 36 as shown in FIG. 4. Such step of vertically placing the jaw member 10 onto the tower 36 is represented as step 92 in FIG. 9. When in the detached position, the balls 54 of the spring-biased latch members 50 are received in the corresponding grooves 60 in the jaw 10. See FIG. 5. After the jaw 10 is placed onto the tower 36 as shown in FIGS. 4 and 5, an axial force must be applied in the direction represented by arrow "M" along axis A'—A' to move the jaw into an attached position. This step is represented as step 94 in FIG. 9. The skilled artisan will readily appreciate that such axial force may be applied to jaw 10 or the base 22 of the workholding apparatus 20 when the jaw 10 is stationary in a myriad of different manners. For example the axial force may be manually applied to the jaw 10 or the base 22 provided that the spring force of the spring-biased latch members can be overcome by such force. In applications wherein the workholding assembly is mounted to a table that can be automatically moved relative to a machine tool spindle, the table can be moved to bring the jaw into contact with the spindle or other stationary object to apply the requisite axial force to the jaw. Similarly, the table could be retained in position and the machine tool then brought into contact with the jaw to urge it into the locked position depicted in FIGS. 7 and 8. Thus, the unique and novel method of attaching the removable jaw lends itself well to automatic jaw attachment and detachment which reduces jaw change over time and improves the efficiency of the machining operations.

When the jaw 10 is forced axially in the "M" direction, the balls 54 of the spring-biased latch members 50 are brought into engagement with the corresponding dimples 62 in the jaw cavity 16 to retain the jaw on the tower portion 36. To remove the jaw member 10 from its corresponding tower portion 36 support member 32, an axial force represented by arrow "N" is applied in an axial direction opposite to direction "M" to move the jaw member 10 to the position illustrated in FIGS. 4 and 5. This step of the present method is represented by 96 in FIG. 9. The jaw 10 is then removed vertically from the tower 36 as represented by step 89 in FIG. 9.

Those of ordinary skill in the art will further appreciate that the significant advantages enjoyed by the subject invention over the prior art can also be achieved when the spring-biased latch members are mounted in the jaw member. More specifically and with reference to FIGS. 10 and 11, there is shown another preferred embodiment of the present invention wherein a jaw member 110 is adapted for attachment to a tower portion 136 of a support member 132. The reader will appreciate that, except for the differences specifically noted below, the jaw member 110 and the support member 132 are substantially identical to the jaw member 10 and support member 32, respectively, as discussed above. In this embodiment, however, the spring-biased latch members 150 are mounted in the jaw member 110 such that their spring-loaded ball members 154 protrude into cavity 116 in the underside 114 of the jaw member 110. As in jaw member 10, an angled retaining groove 117 is machined into one end of the cavity 116 and is arranged to cooperate with an angled retaining surface 146 machined into one end of the tower 136 of support member 132. It will be appreciated that, in a preferred embodiment, the angular orientations of groove 117 and retaining surface 146 are arranged as described above.

Figure 10:
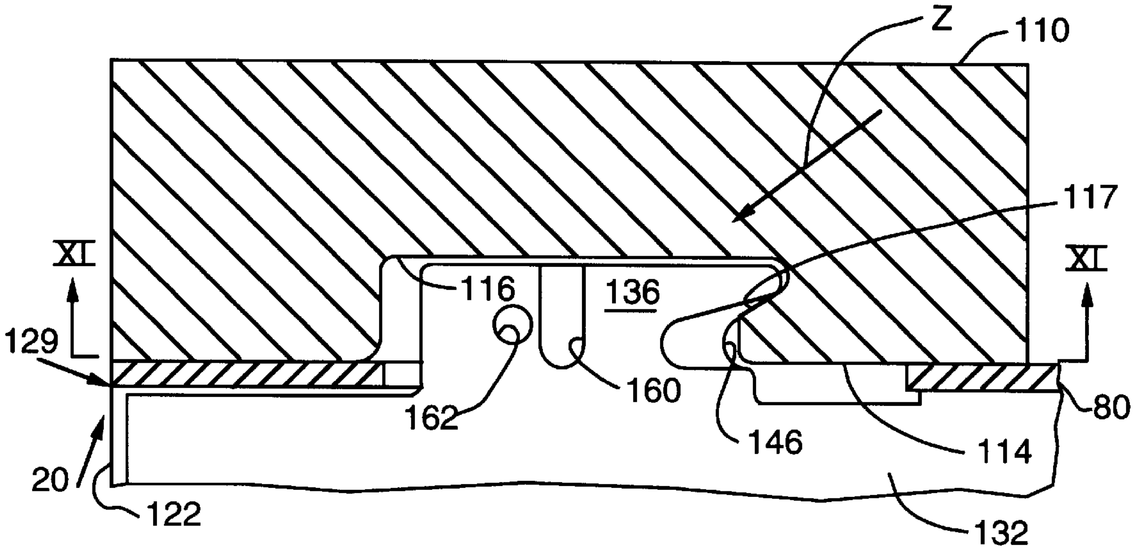
FIG. 10 is a side elevational view of another preferred removable jaw member of the present invention attached to another preferred support member of the present invention with the jaw member shown in cross-section for clarity.
Figure 11:
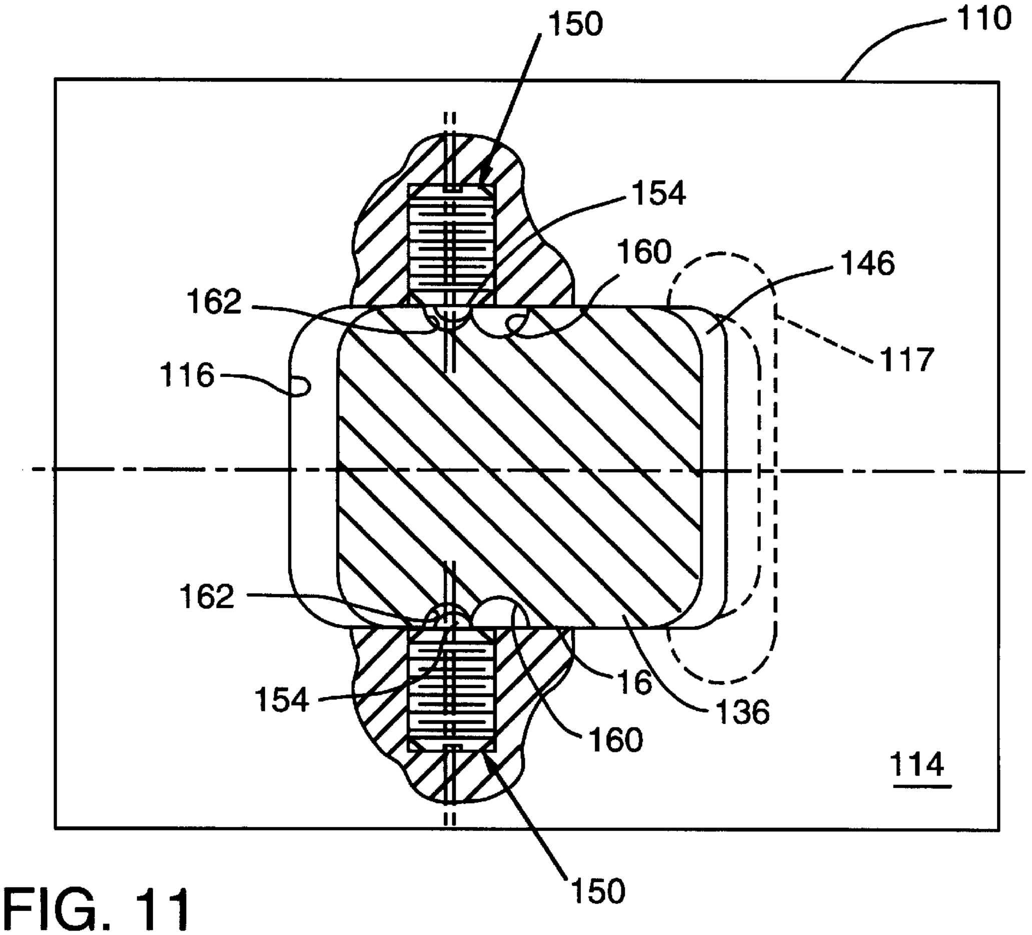
FIG. 11 is a partial sectional view of the jaw member and support member assembly depicted in FIG. 11 taken along line XI—XI in FIG. 10.

Spring-biased latch members 150 are mounted adjacent each lateral side of cavity 116, coaxially along axis "D—D" as shown in FIG. 11. As also shown in FIGS. 10 and 11, a groove 160 and a dimple 162 are machined into the tower 136 to cooperate with the corresponding ball members 154 of the spring-biased latch members 150 in the jaw member 110. When the jaw member 110 is initially placed over the tower member 136 such that the tower member 136 is received within the cavity 116, the balls 154 are received in their corresponding grooves 160. To attach the jaw member 110 to the tower portion 136, an axial force is applied to either the base 122 of the workholding apparatus 120 in which the support member 132 is received or the jaw member 110 to cause the jaw member 110 to be moved to the attached position depicted in FIGS. 10 and 11. To detach the jaw member 110, the axial force is applied in the opposite direction. The skilled artisan will appreciate that the relationships of the centerlines of the spring-biased latch members 150 and their corresponding dimples 162 in the tower 136 are preferably identical to those relationships in the earlier discussed preferred embodiment, such that when the jaw member 110 or support member 132 is moved to the attached position, the balls 154 are offset relative to the centerlines of the dimples 162 and thus engage a side of the corresponding dimples 162 to retain the jaw member on the tower 136. As was discussed above, those of ordinary skill in the art will understand that such orientation of the dimple 162 relative to the ball of the ball plunger 154 will result in the jaw member 110 being urged downward onto the shield 80 (if employed) or the planar worksurface 29. Such downward force is represented by arrow "Z" in FIG. 10 and serves to retain the undercut groove 117 of the jaw member 110 in engagement with the angled retaining surface 146 of the tower 136 and also serves to prevent infiltration of debris between the jaw member 110 and the shield 80 or the rails 128.

Figure 12:
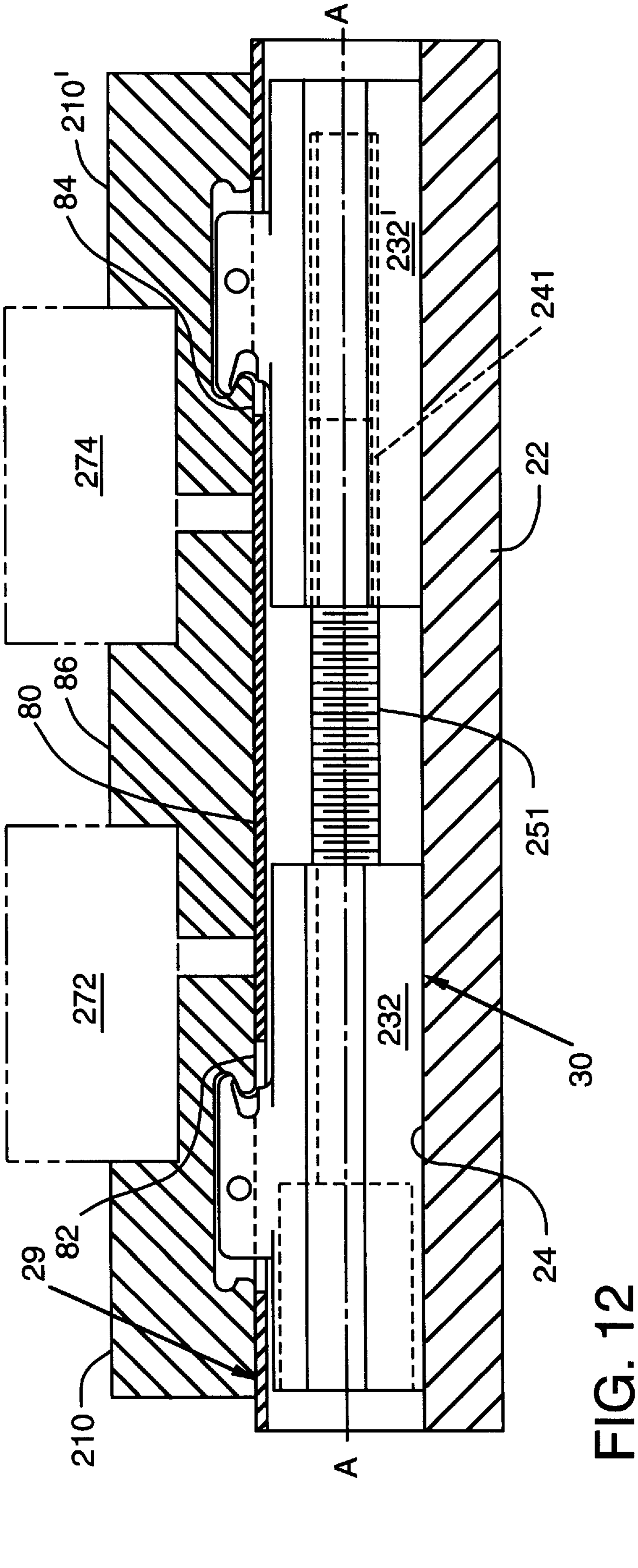
FIG. 12 is a partial cross-sectional elevational view of another preferred vise-like workholding apparatus of the present invention.

Another preferred embodiment is depicted in FIGS. 12–20. Those elements that were described above and remain unchanged in this embodiment will be identified by their element numbers as set forth above. As such, it will be appreciated that the base member 22 as shown in FIG. 12 has a worksurface 29 and a "first" longitudinal axis A—A. This embodiment employs a clamping assembly 230 that is received within the base member 22 of the workholder for selective movement within the cavity 24 in the base member 22. The clamping assembly 230 includes a first movable support member 232 and a second movable support member 232' which are each slidably received within the cavity 24. As shown in FIG. 12, a first jaw member 210 is preferably removably attached to the first movable support member 232 and a second jaw member 210' is preferably removably attached to the second movable support member 232'.

The clamping assembly 230 also includes a screw shaft 251 that is received within the cavity 24 in the base member 22. One end of the screw shaft 251 is provided with threads which are intended to engage a threaded bore 241 within the second movable support member 232'. In addition, the screw shaft 251 includes means (not shown) for engaging and displacing the first movable support member 232. The screw shaft 251 passes through the first movable support member 232 while the other end of the screw shaft 251 has a socket therein for facilitating the application of rotary motion to the screw shaft 251.

As described above, a center jaw member 86 may also be attached to the base 22 between the first and second movable support members (232, 232'). As can be seen in FIG. 12, the center jaw member 86 is preferably arranged on base 22 such that the first and second movable support members (232, 232') may move toward and away from the center jaw member 86 to clamp and unclamp workpieces 272 and 274 between the center jaw member 86 and first and second jaw members (210, 210'). For example, when the screw shaft 251 is rotated clockwise, the first movable support member 232 is moved relative to the center jaw member 86, thereby causing the first jaw member 210 to move toward the center jaw member 86 to clamp a first workpiece 272 therebetween. In addition, the clockwise rotation of the screw shaft 251 causes the second movable support member 232' to move toward the center jaw member 86 to clamp a second workpiece 274 between the jaw members (86, 210').

Figure 13:
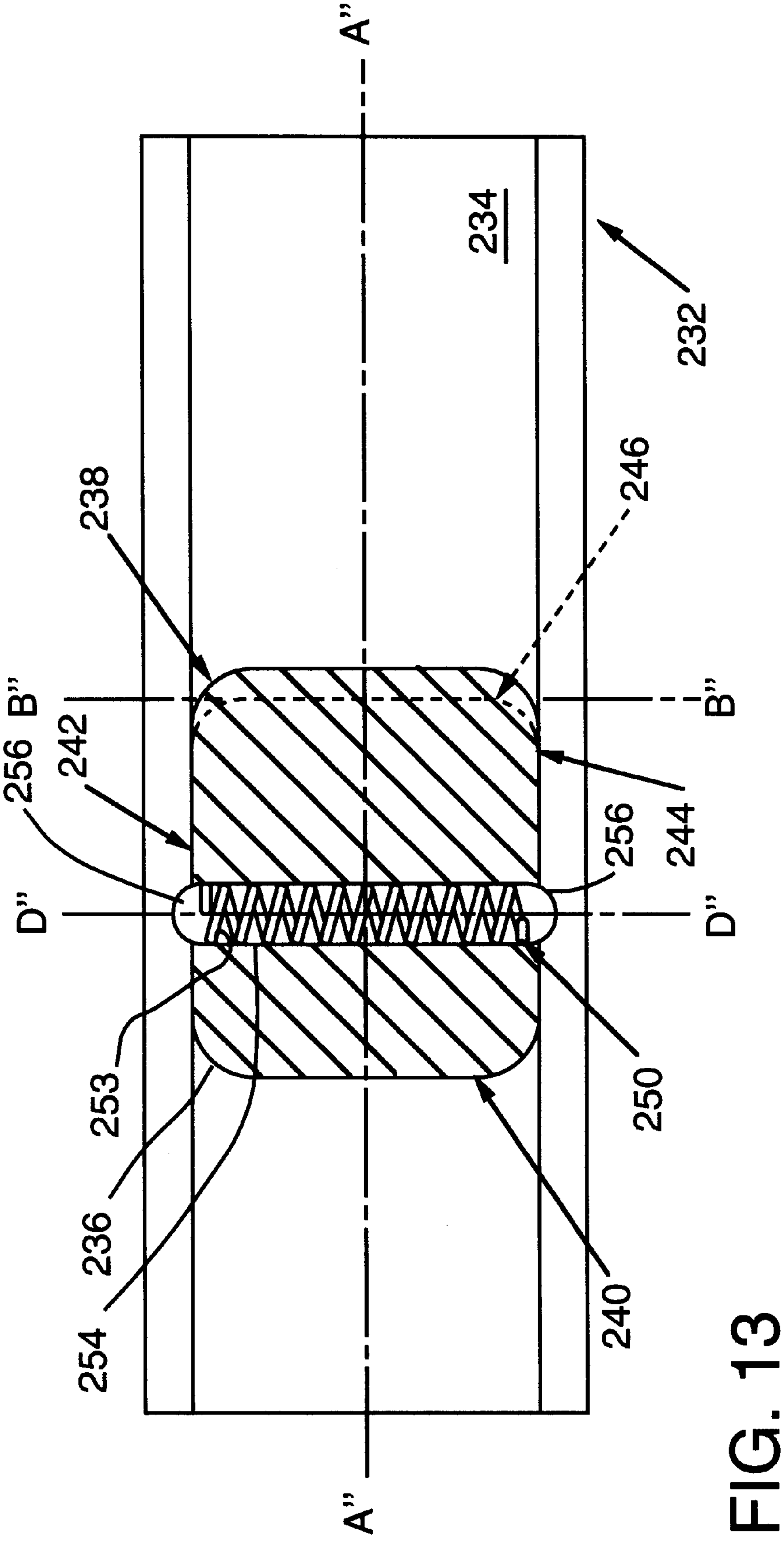
FIG. 13 is a plan view of a preferred movable support member of the preferred workholding apparatus of FIG. 12.
Figure 14:
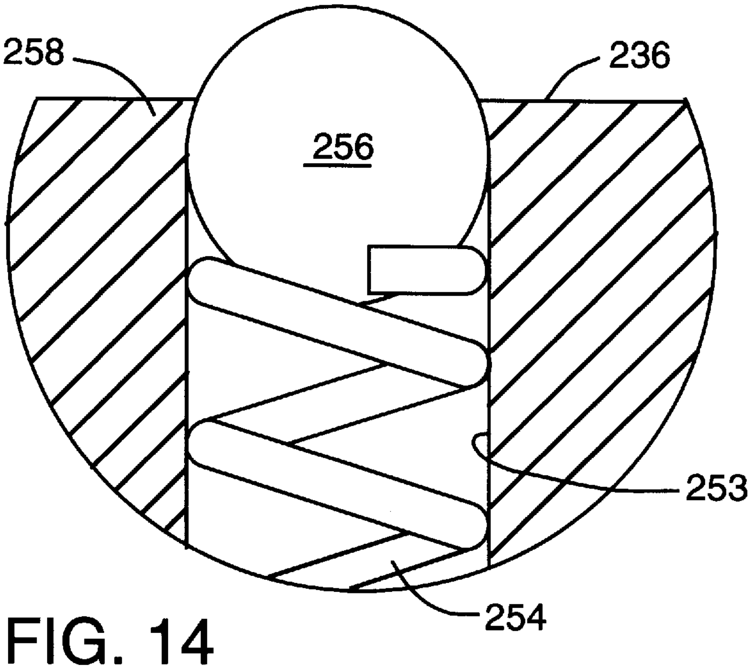
FIG. 14 is an enlarged partial view of the ball and spring arrangement of the support member depicted in FIG. 13.
Figure 18:
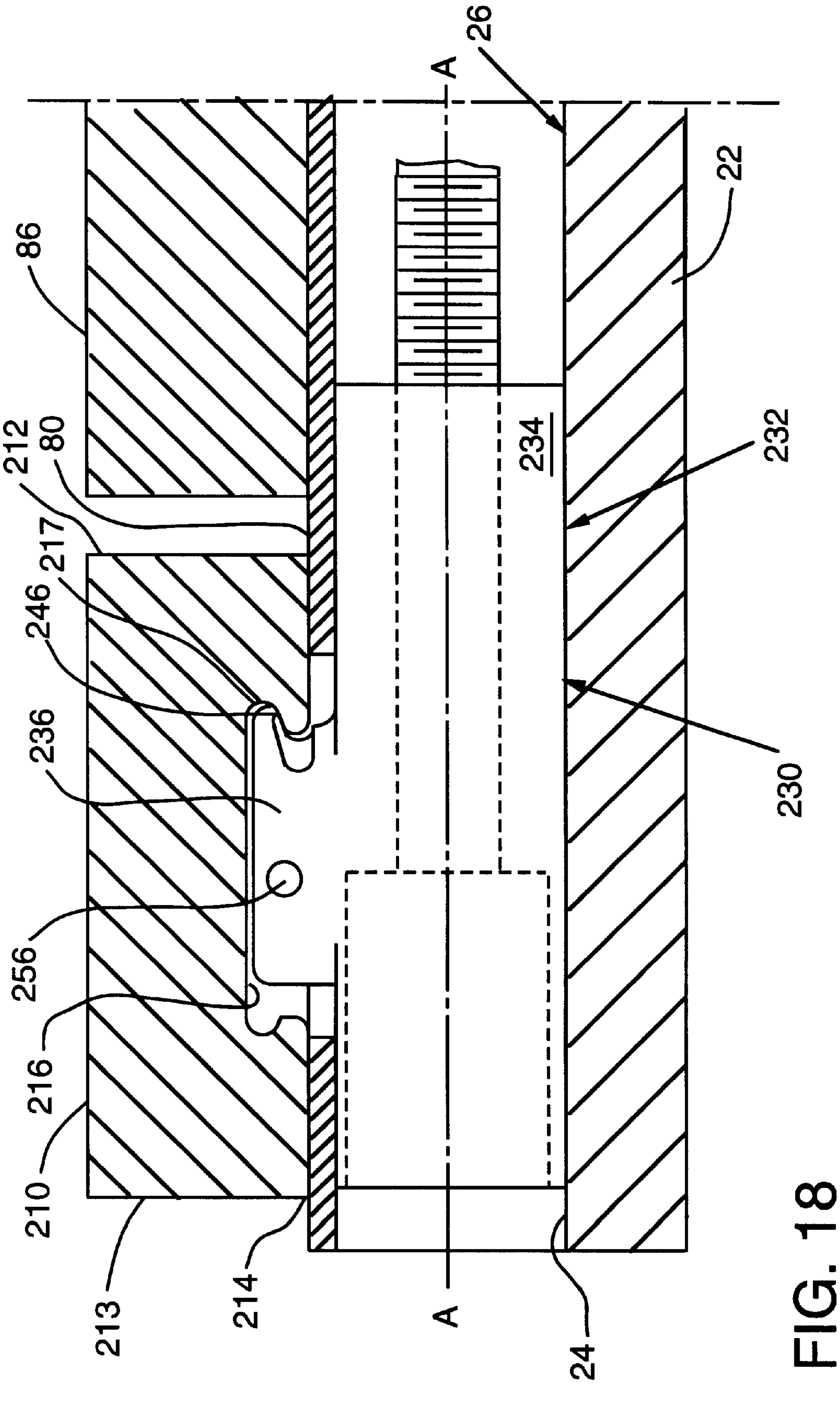
FIG. 18 is an enlarged partial sectional view of the workholding apparatus depicted in FIG. 12.

The construction of a preferred first movable support member 232 and corresponding first removable jaw member 210 will now be described in detail, with it being understood that the second movable jaw member 210' and the second movable support member 232' are preferably constructed in the same manner. Referring now to FIGS. 13 and 18, a preferred first movable support member 232 has a longitudinally extending body portion 234 that is adapted to be slidably received within the cavity 26 of the vise base 22. As can also be seen in FIGS. 13 and 18, the movable support member 232 has an attachment portion or tower 236 that is adapted to protrude above the planar worksurface 29.

As shown in FIG. 13, in a preferred embodiment of the present invention, the tower 236 has a first end 238, a second end 240 and two lateral sides (242, 244). The tower portion 236 has a second longitudinal axis A"—A" that extends therethrough. Preferably, the first and second ends (238, 240) of the tower portion 236 are substantially transverse to the axis A"—A" and lateral sides (242, 244) are substantially parallel to axis A"—A". A retaining surface 246 is machined in the first end 238 of the tower 236 along axis B"—B" that is substantially transverse to axis A"—A". See FIGS. 13 and 18. In a preferred embodiment, the retaining surface 246 is provided at an approximate 45° angle relative to the planar worksurface 29. Those of ordinary skill in the art will appreciate that other retaining features could also be successfully employed.

Also in a preferred embodiment, a spring-biased retainer/latch assembly 250 is mounted within the tower portion 236 of a support member 232. Preferably, a bore 253 is provided in tower portion 236 along axis D"—D" which is substantially transverse to axis A"—A" and substantially parallel to axis B"—B". Received within the bore 253 is a spring 254 and two ball members 256. To retain the ball members 256 within the bore 253, an inwardly extending annular retaining protrusion 258 is preferably machined at each end of the bore 253. See FIG. 14. The skilled artisan will understand that the spring 254 biases the ball members 256 outwardly; however, the ball members 256 are retained within bore 253 by virtue of their contact with the corresponding annular protrusion 258.

Figure 15:
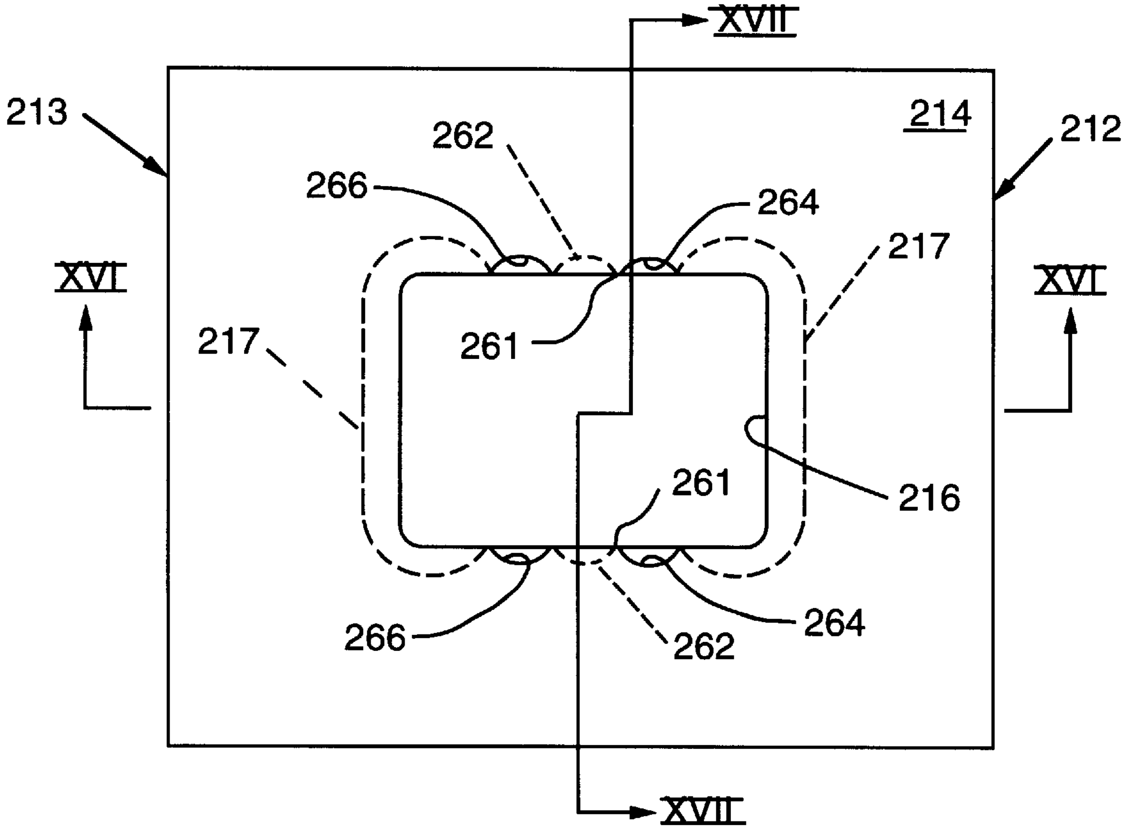
FIG. 15 is a bottom view of a preferred jaw member depicted in FIG. 12.
Figure 16:
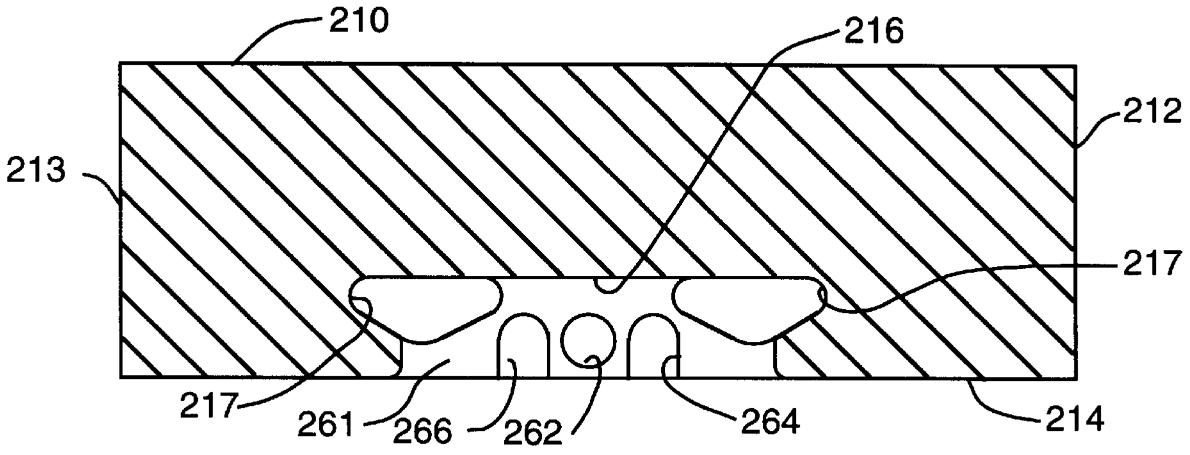
FIG. 16 is a cross-sectional view of the jaw member of FIG. 15 taken along line XVI—XVI in FIG. 15.
Figure 17:
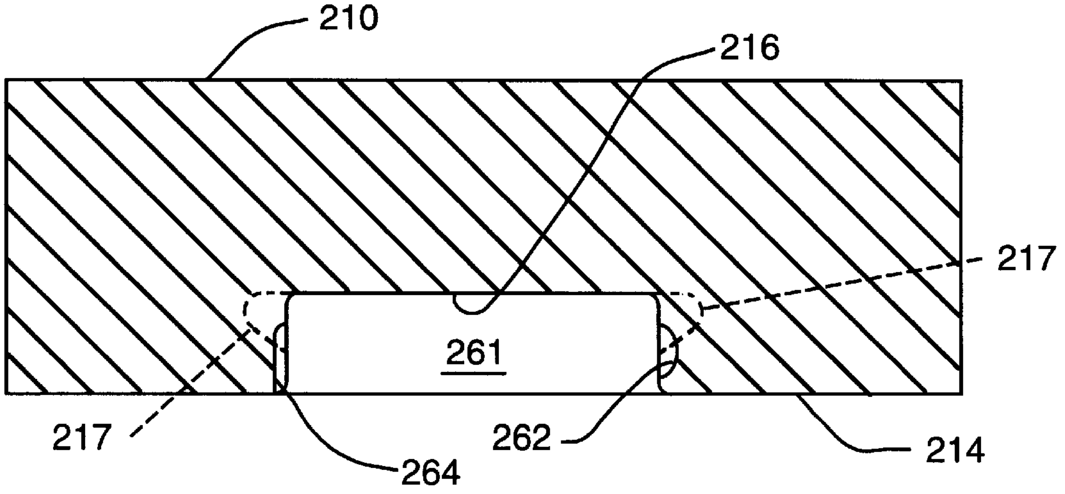
FIG. 17 is a cross-sectional view of the jaw member of FIGS. 15 and 16 taken along line XVII—XVII of FIG. 15.

In a preferred embodiment, jaw member 210 is fabricated from aluminum; however, jaw member 210 may be fabricated from a variety of other suitable materials such as steel and the like. As can be seen in FIGS. 15, 16 and 18, jaw member 210 has clamping surfaces (212, 213) and a bottom surface 214 that is adapted to slidably move on the shield 80 (if employed) or the worksurface 29 of the base 22. In a preferred embodiment, a cavity 216 that is sized to receive the tower portion 236 of the support member 232 is provided in the bottom surface 214 of the jaw 210. In this preferred embodiment, each longitudinal end of the cavity 216 has an undercut groove 217 machined therein that is adapted to alternatively selectively mate with the angled retaining surface 246 machined in the tower portion 236 of the support member. That is, cavity 216 has “first” and “second” angled retaining grooves 217 machine therein as shown in FIGS. 15–17. The skilled artisan will appreciate that the undercut grooves 217 are each machined at an angle relative to the bottom surface 214 of the jaw 210 that is substantially equal to the angle of the retaining surface 246 of the tower 236.

As can be seen in FIGS. 15 and 16 each cavity wall 261 of the cavity 216 has a centrally located engagement area in the form of a dimple 262 and two grooves (264, 266) machined therein. In a preferred embodiment, recesses (264, 266) each has a radius of 4 mm and is 2 mm deep at its center. Also, dimple 262 preferably has a radius of 4 mm and is 2 mm deep. These dimensions work well with a ball members 256 that are 7 mm in diameter. As noted above, those of ordinary skill in the art will appreciate that the sizes and orientations of the dimple 262 and recesses (264, 266) are dependent upon the size and orientations of the ball members 256. In a preferred embodiment, the vertical and horizontal centerlines (not shown) of the ball members 256 are offset from the corresponding vertical and horizontal centerlines of the dimple 262 (not shown) by 1 mm each in the manner described hereinabove such that when the jaw member 210 is attached to the tower portion 236, the jaw member 210 is retained on the tower portion 236 and urged downward onto the shield 80 (if employed) or the worksurface 29.

Also, those of ordinary skill in the art will appreciate that by providing undercut grooves 217 in each longitudinal end of the cavity 216, the jaw member 210 can be attached to the tower portion 236 in two different orientations. For example, the jaw member 210 can be attached to the tower portion 236 such that the clamping surface 212 faces the center jaw 86. In the alternative, the jaw member 210 can be attached to the tower portion 236 such that the clamping surface 213 faces the center jaw 86. Such construction conveniently enables different notches, grooves, cut outs, etc. to be machined into the clamping surfaces to enable one jaw member 210 to be used to selectively clamp differently configured workpieces.

Also, today’s competitive environment facing most machine shop owners requires optimum utilization of all machine tool assets to ensure maximum productivity and profitability. Depending upon the types and numbers of workpieces to be machined, oftentimes the machinist must utilize vertically-mounted workholding devices which enable more of the “machining envelope” of the machine tool to be utilized. Examples of such vertically-mounted workholding devices are manufactured by Chick Workholding Solutions, Inc. of 500 Keystone Drive, Warrendale, Pa. 15086 under the trademark MULTI-LOK™.

Figure 19:
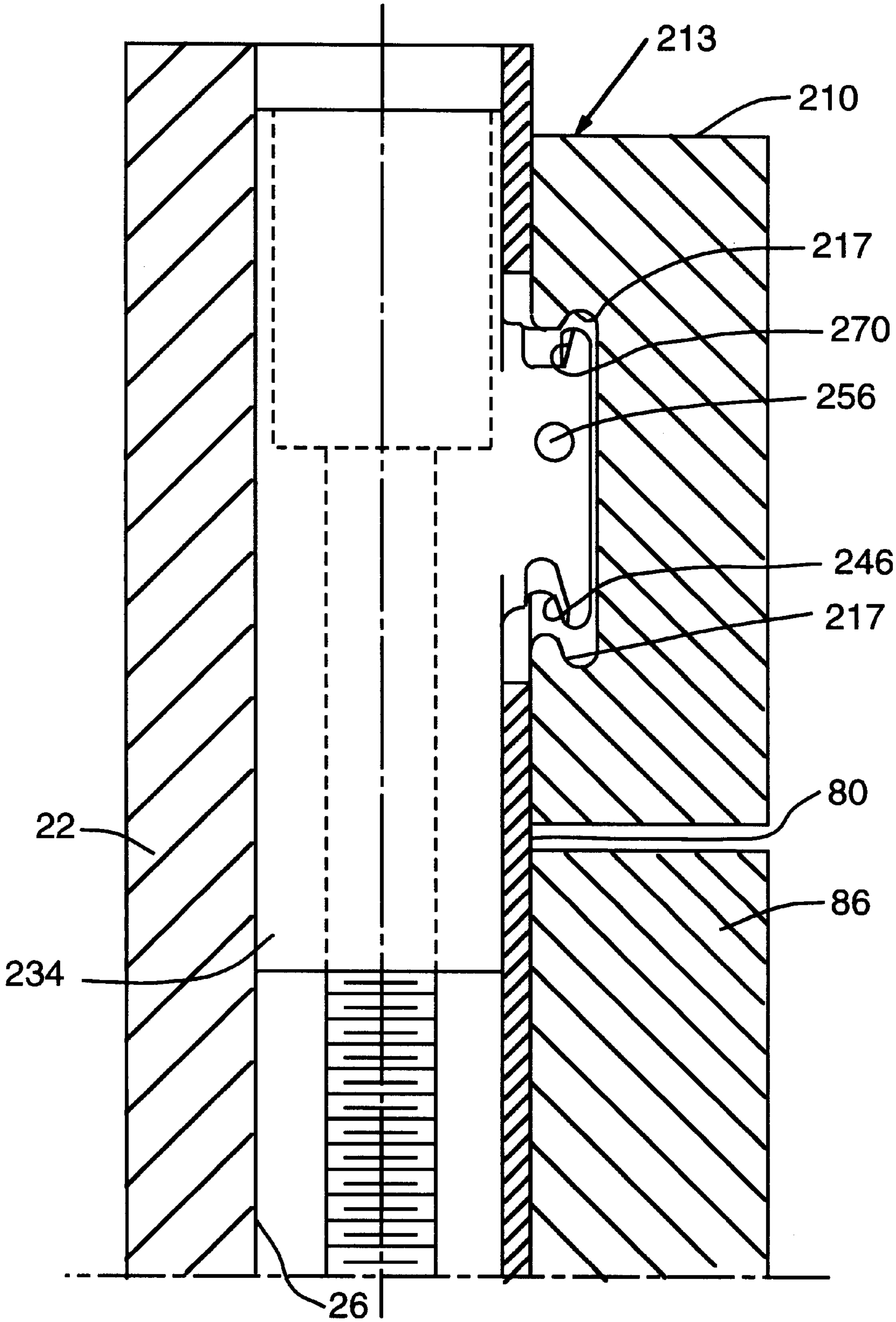
FIG. 19 is a partial cross-sectional view of a preferred jaw member of the present invention attached to another preferred support member that is supported within a vertically mounted workholding apparatus.
Figure 20:
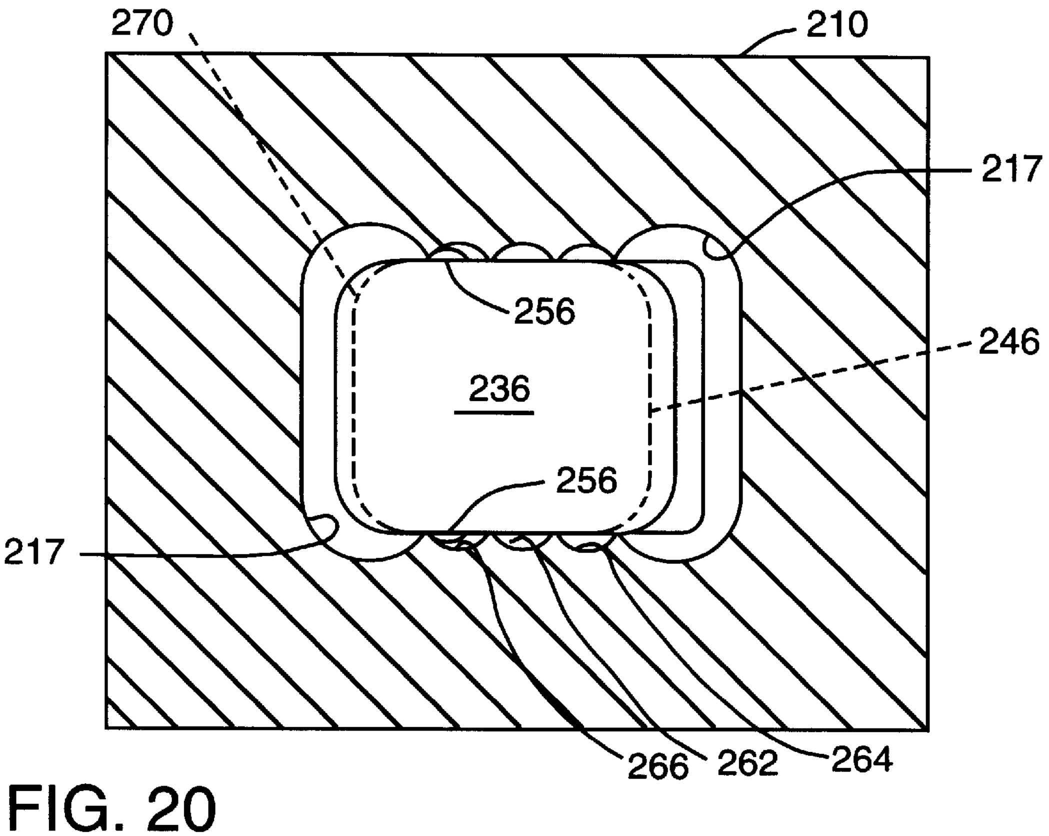
FIG. 20 is a plan view of a preferred jaw member received on a tower portion of a preferred support member in a released position, with the jaw member shown in cross-section for clarity.
Figure 21:
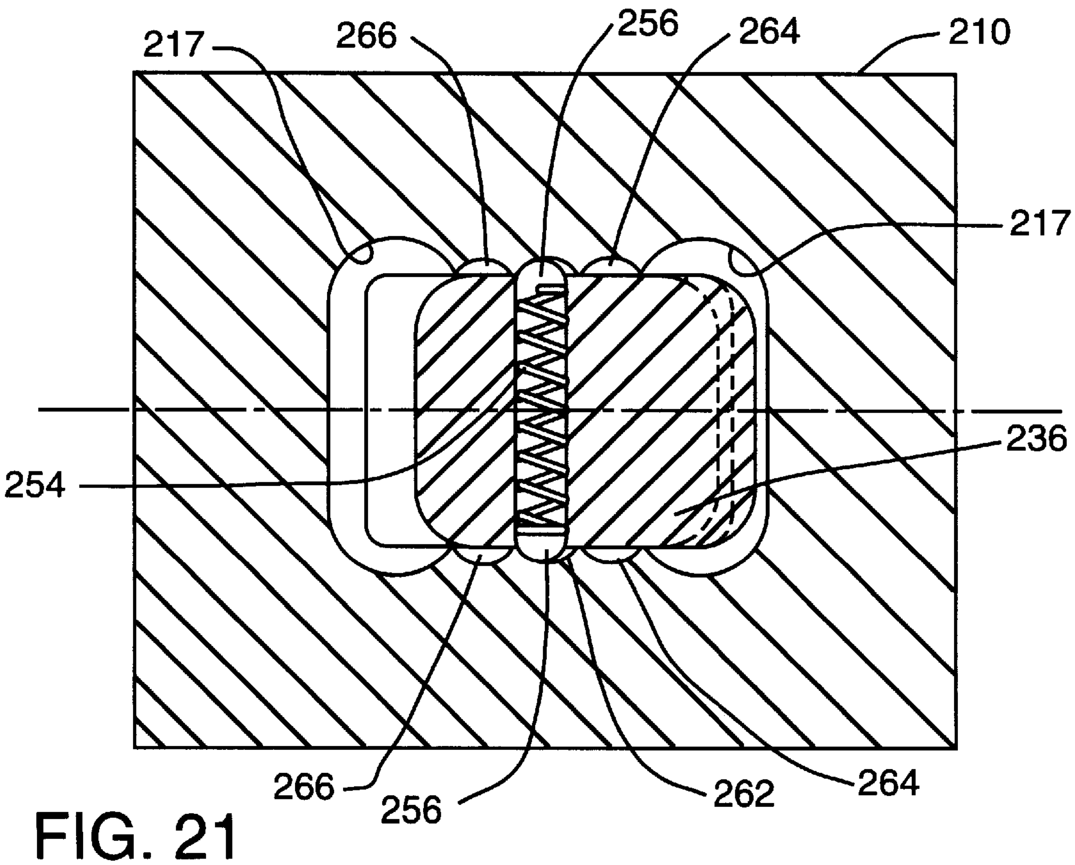
FIG. 21 is a cross-sectional plan view of a preferred jaw member attached to a tower portion of a preferred support member of the present invention.

Those of ordinary skill in the art will appreciate that the preferred embodiments of the subject invention disclosed herein are well-suited for use with such vertically-mounted devices. However, if the jaw members are detached from their corresponding towers, the jaw members could accidentally fall off of their corresponding tower portions which could injure the machinist or attending personnel and/or damage the workholders and/or machine tools. As shown in FIGS. 19 and 20, to prevent such problem, a recessed groove 270 is preferably machined in the rear end of the tower portion 236. As can be seen in those Figures, when the jaw 210 is in a released position, the corresponding undercut groove 217 engages the recessed groove 270 to prevent the jaw 210 from sliding off of the tower, portion 236.

Figure 22:
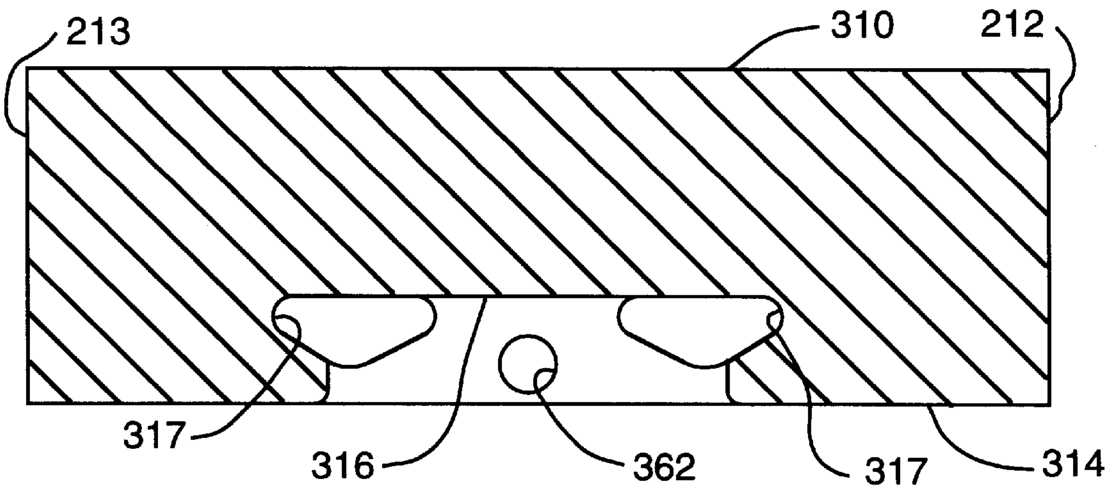
FIG. 22 is a cross-sectional view of another preferred jaw member of the present invention.
Figure 23:
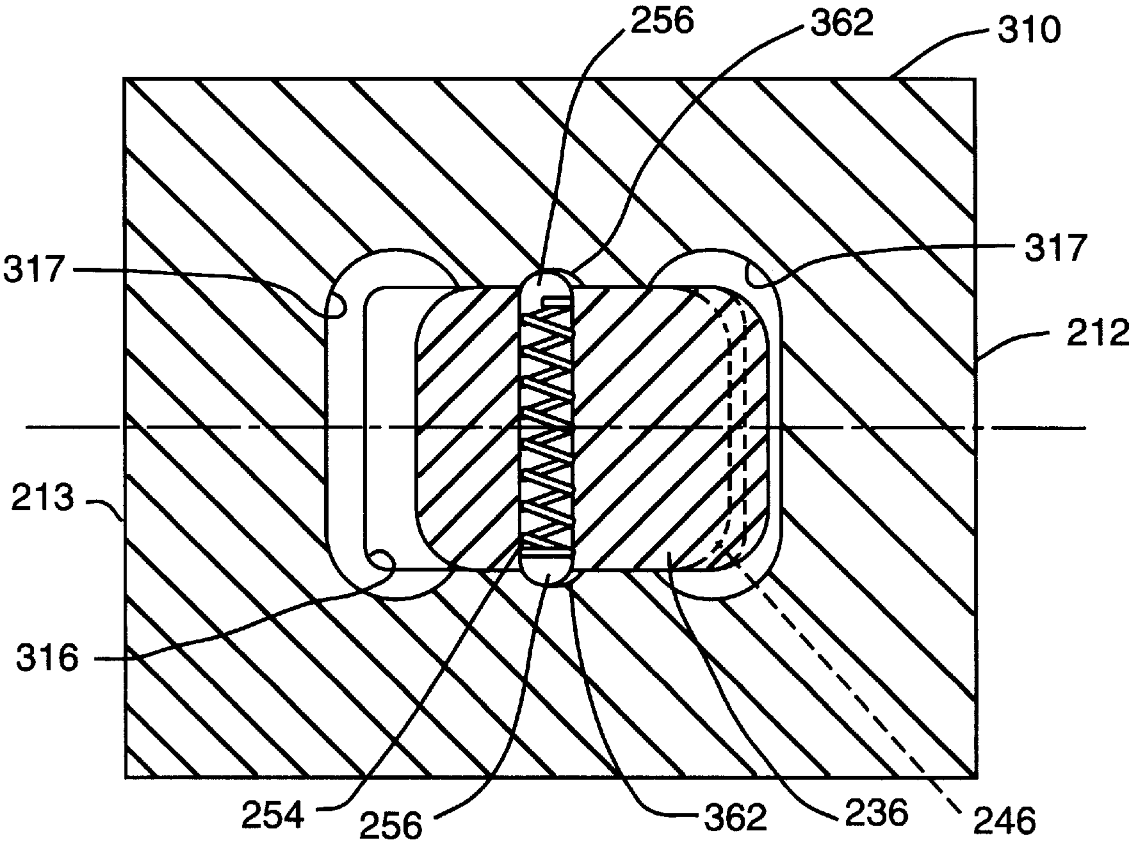
FIG. 23 is a cross-sectional plan view of the jaw member of FIG. 22 attached to the tower portion of another preferred support member.

Another preferred embodiment of the present invention is depicted in FIGS. 22–25. In this preferred embodiment, jaw member 310 is fabricated from aluminum; however, jaw member 310 may be fabricated from a variety of other suitable materials such as steel and the like. As can be seen in FIGS. 22 and 23, jaw member 310 has clamping surfaces (212, 213) and a bottom surface 314 that is adapted to slidably move on the shield 80 (if employed) or the worksurface 29 of the base 22. In a preferred embodiment, a cavity 316 that is sized to receive the tower portion 236 of the support member 232 therein is provided in the bottom surface 314 of the jaw 310. Each longitudinal end of the cavity 316 preferably has an undercut groove 317 machined therein that is adapted to selectively mate with the angled retaining surface 246 machined in the tower portion 236 of the support member 232.

As can be seen in FIGS. 22 and 23, each lateral side of the cavity 316 has a centrally located dimple 362 machined therein that preferably has a radius of 4 mm and is 2 mm deep. These dimensions work well with a ball members 256 that are 7 mm in diameter. As noted above, those of ordinary skill in the art will appreciate that the sizes and orientations of the dimple 262 are dependent upon the size and orientations of the ball members 256 of the corresponding spring-biased latch assembly 250 mounted in the tower 236. In a preferred embodiment, the vertical and horizontal centerlines (not shown) of the ball members 256 are offset from the vertical and horizontal centerlines of a corresponding dimple 262 by 1 mm each in the manner described hereinabove such that when the jaw member 310 is attached to the tower portion 236, the jaw member 310 is retained on the tower portion 236 and urged downward onto the shield 80 (if employed) or the worksurface 29.

Figure 24:
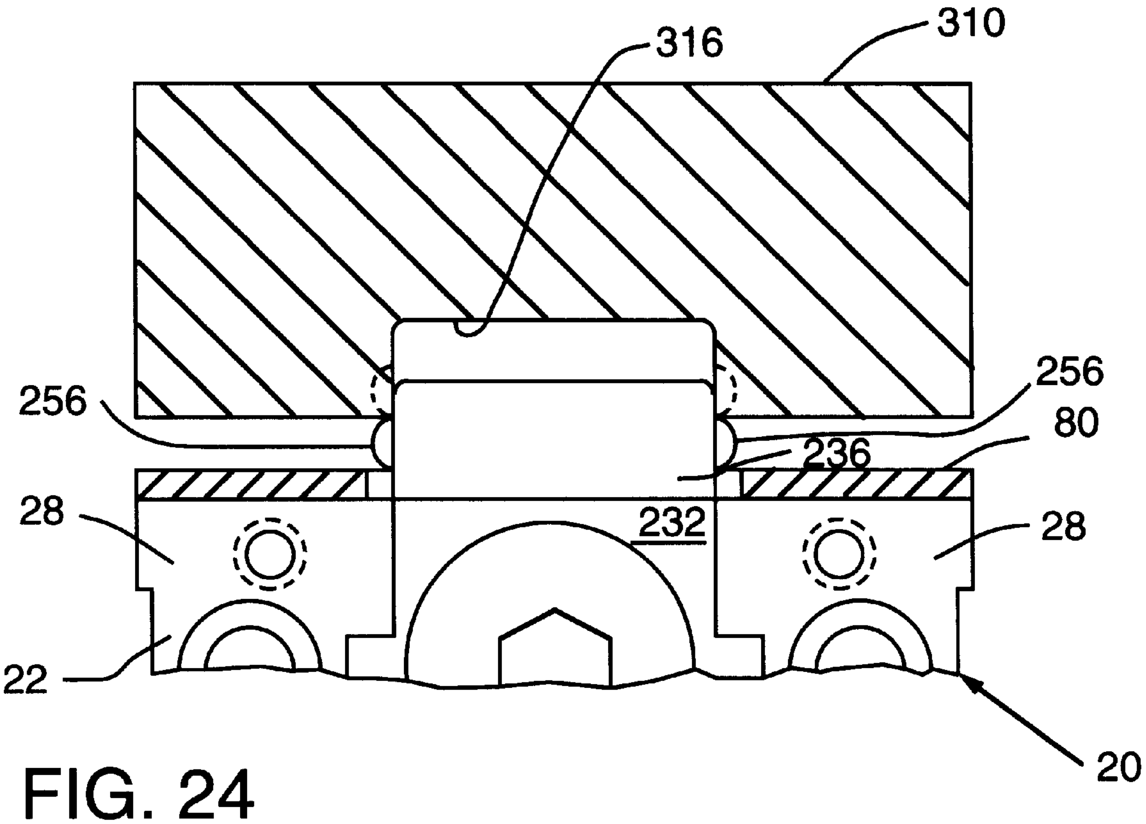
FIG. 24 is an end elevational view of a workholding apparatus supporting a support member depicted in FIG. 22 with a jaw member shown in cross-section prior to attachment to the tower portion of the support member.
Figure 25:
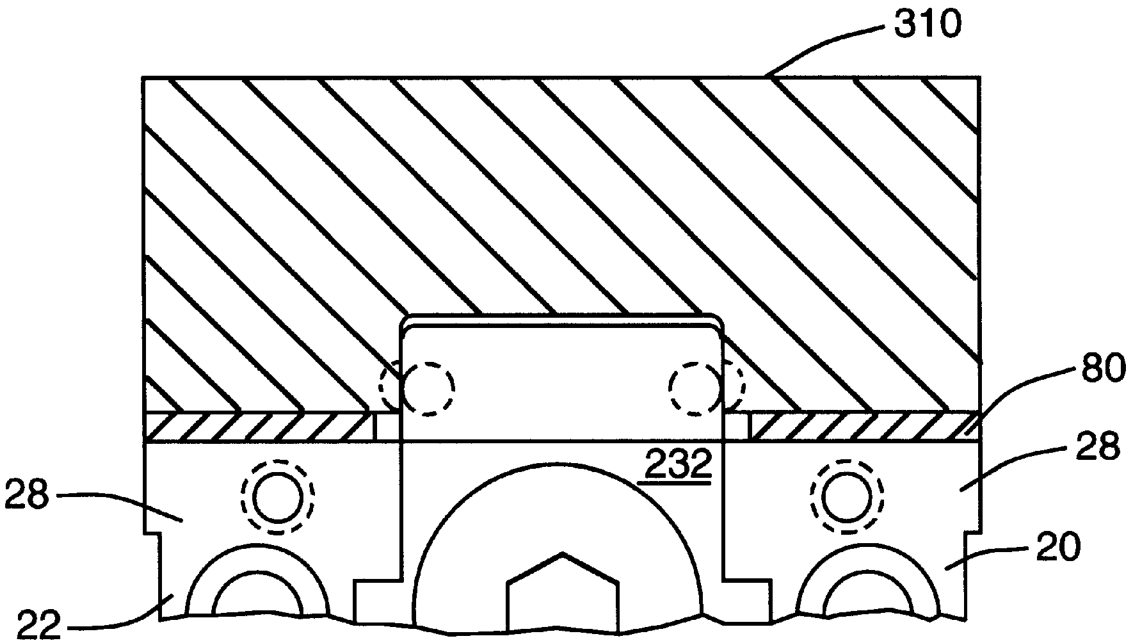
FIG. 25 is an end elevational view of the workholding apparatus and jaw member of FIG. 24 shown in cross-section after the jaw member has been pressed onto the tower portion of the support member.

To install the jaw 310 on a corresponding tower portion 236, the jaw is aligned over the tower 236 as shown in FIG. 24. Thereafter, a downward force is applied to the jaw member 310 until the bottom surface 314 is received on the shield 80 (if employed) or the worksurface 29. Because the dimples 362 are not aligned vertically with the corresponding ball members 256, the ball members 256 are biased into the bore 254 in the tower 236. After the jaw member 310 is completely pressed onto the tower as shown in FIG. 25, the jaw member 310 is then longitudinally moved into the attached position as shown in FIG. 23. In the alternative, the jaw member 310 can be attached to a corresponding tower portion 236 by placing the jaw member 310 on the tower portion 236 such that one of the undercut grooves 360 thereof engages the retaining surface 246. Thereafter, a vertical or arcuate force is applied to the jaw member 310. Initially, the ball members 256 will engage the inner walls of the cavity 316 and be biased within the bore 254 in the tower portion 236 until the jaw member 310 is forced into the attached position (FIG. 23) wherein the ball members 256 engage the corresponding dimples 262.

While the preferred embodiments of the present invention have been disclosed herein in connection with movable jaws for vise-like workholders, the skilled artisan will appreciate that the present invention will work well for attaching a removable jaw to a non-movable support member. Thus, the present invention could be employed to attach removable jaws to movable and fixed support members of a vise-like workholding apparatus.

Accordingly, the present invention provides solutions to the aforementioned problems associated with vise-like workholding apparatuses. The present invention provides a removable jaw for use in connection with a vise-like workholder that is relatively inexpensive to manufacture when compared to other workholder jaws. Due to the unique manner of fastening the jaw to the vise, the jaws can be easily manually detached from the vise. While such advantages are apparent from the foregoing disclosure, it will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. A removable jaw assembly for a workholding apparatus having a base defining a worksurface and a first longitudinal axis, comprising:

a tower portion on said workholding apparatus that protrudes above said worksurface, said tower portion having a second longitudinal axis substantially parallel to said first longitudinal axis;

a removable jaw member having a cavity therein sized to receive said tower portion therein, said cavity having at least one cavity wall defining a first engagement area; and at least one retainer in said tower portion oriented to selectively releasably engage said engagement area of said removable jaw member perpendicularly to said second longitudinal axis when said tower portion is received in said cavity to releasably attach said removable jaw member to said tower portion.

2. The removable jaw assembly of claim 1 wherein each said retainer is oriented relative to said corresponding engagement area such that when said removable jaw member is attached to said tower portion, each said retainer biases said removable jaw member onto said worksurface.

3. The removable jaw assembly of claim 1 wherein each said retainer comprises a spring-biased latch member adapted to engage said corresponding engagement area of said removable jaw member.

4. The removable jaw assembly of claim 3 wherein said cavity in said removable jaw member is sized relative to said tower portion such that when said tower portion is received therein, said removable jaw member can be selectively longitudinally moved from a released position wherein said removable jaw member can be vertically removed from said tower portion to an attached position wherein said removable jaw member is attached to said tower portion.

5. The removable jaw assembly of claim 4 further comprising first and second recesses in each said engagement area of said removable jaw member corresponding to each said spring-biased latch member for selective engagement therewith such that when said removable jaw member is in said released position, each said latch member engages said corresponding first recess and when said removable jaw member is moved to said attached position, each said latch member engages said corresponding second recess to attach said removable jaw member to said tower portion.

6. The removable jaw assembly of claim 5 wherein each said spring-biased latch member includes a ball member and wherein said first recess is sized relative to said corresponding ball member such that when said ball member is received therein, said removable jaw member can be vertically detached from said corresponding tower portion and wherein said second recess is sized and oriented relative to said corresponding ball member such that when said ball member engages said second recess, said removable jaw member is biased onto said worksurface and said removable jaw member is retained on said tower portion.

7. The removable jaw assembly of claim 1 wherein said cavity in said removable jaw member is sized relative to said tower portion such that when said tower portion is received therein, said removable jaw member can be selectively longitudinally moved from a released position wherein said removable jaw member can be vertically removed from said tower portion to an attached position wherein said removable jaw member is attached to said tower portion and wherein said jaw assembly further comprises:

a first angled retaining surface formed in one side of said tower portion along a first axis that is substantially transverse to said second longitudinal axis; and a first angled retaining groove formed in a second wall of said cavity configured to selectively engage said first angled retaining groove in said tower portion when said removable jaw member is in said attached position.

8. The removable jaw assembly of claim 7 wherein said removable jaw member has a substantially planar bottom surface and wherein said first angled retaining groove is formed at an approximate forty-five degree angle with respect to said planar bottom surface.

9. The removable jaw assembly of claim 1 wherein said tower portion comprises a portion of a movable support member that is selectively movable within a longitudinally extending slot provided in said base member toward and away from a second jaw member that is attached to said base member.

10. The removable jaw assembly of claim 1 wherein said removable jaw member is constructed to be selectively removably attached to said tower portion in a first clamping orientation and a second clamping orientation.

11. The removable jaw assembly of claim 10 further comprising:

a first angled retaining surface formed in one side of said tower portion along a first axis that is substantially transverse to said second longitudinal axis;

a first angled retaining groove formed in a second wall of said cavity configured to selectively engage said first angled retaining surface in said tower portion when said removable jaw member is in said first clamping, orientation; and a second angled retaining groove formed in a third wall of said cavity configured to selectively engage said first angled retaining surface in said tower portion when said removable jaw member is in said second clamping orientation.

12. The removable jaw assembly of claim 11 wherein each said retainer comprises a spring-biased latch member adapted to engage said corresponding engagement area of said removable jaw member when said removable jaw member is in either one of said first and said second clamping orientations.

13. The removable jaw assembly of claim 12 wherein said cavity has a fourth wall opposite said first wall, said fourth wall defining a second engagement area and wherein said spring biased latch member comprises:

a bore extending through said tower portion transverse to said second longitudinal axis of said tower portion;

a pair of engagement balls slidably received in said bore, said bore having retaining means at each end thereof to retain said balls within said bore while permitting a portion of each said ball to protrude out of a corresponding end of said bore to selectively engage one of said first and second engagement areas when said tower portion is received within said cavity; and a spring member housed within said bore to outwardly bias each said engagement ball into engagement with one of said first and second engagement areas when said tower portion is received in said cavity.

14. A removable jaw assembly for a workholding apparatus having a base defining a worksurface and a first longitudinal axis, comprising:

a tower portion on said workholding apparatus that protrudes above said worksurface, said tower portion having a second longitudinal axis that is substantially parallel to said first longitudinal axis and at least one engagement area thereon; and a removable jaw member having a cavity therein sized to receive said tower portion therein, said removable jaw member having at least one retainer therein oriented to selectively releasably engage a corresponding engagement area of said tower portion perpendicularly to said second longitudinal axis when said tower portion is received in said cavity to releasably attach said removable jaw member to said tower portion.

15. The removable jaw assembly of claim 14 wherein each said retainer is oriented relative to said corresponding engagement area such that when said removable jaw member is attached to said tower portion, each said retainer biases said removable jaw member onto said worksurface.

16. The removable jaw assembly of claim 14 wherein each said retainer comprises a spring-biased latch member adapted to engage said corresponding engagement area of said tower portion.

17. The removable jaw assembly of claim 16 wherein said cavity in said removable jaw member is sized relative to said tower portion such that when said tower portion is received therein, said removable jaw member can be selectively longitudinally moved from a released position wherein said removable jaw member can be vertically removed from said tower portion to an attached position wherein said removable jaw member is attached to said tower portion.

18. The removable jaw assembly of claim 17 further comprising first and second recesses in each said engagement area of said tower portion corresponding to each said spring-biased latch member for selective engagement therewith such that when said removable jaw member is in said released position, each said latch member engages said corresponding first recess and when said removable jaw member is moved to said attached position, each said latch member engages said corresponding second recess to attach said removable jaw member to said tower portion.

19. The removable jaw assembly of claim 18 wherein each said spring-biased latch member includes a ball member and wherein said first recess is sized relative to said corresponding ball member such that when said ball member is received therein, said removable jaw member can be vertically detached from said corresponding tower portion and wherein said second recess is sized and oriented relative to said corresponding ball member such that when said ball member engages said second recess, said removable jaw member is biased onto said worksurface and said removable jaw member is retained o n said tower portion.

20. The removable jaw assembly of claim 14 wherein said cavity in said removable jaw member is sized relative to said tower portion such that when said tower portion is received therein, said removable jaw member can be selectively longitudinally moved from a released position wherein said removable jaw member can be vertically removed from said tower portion to an attached position wherein said removable jaw member is attached to said tower portion and wherein said jaw assembly further comprises:

a primary angled retaining groove formed in one side of said tower portion along a first axis that is substantially transverse to said second longitudinal axis; and a first angled retaining groove formed in a first wall of said cavity configured to selectively engage said primary angled retaining groove in said tower portion when said removable jaw member is in said attached position.

21. The removable jaw assembly of claim 20 wherein said removable jaw member has a substantially planar bottom surface and wherein said second angled retaining groove is formed at approximately a forty-five degree angle with respect to said planar bottom surface.

22. The removable jaw assembly of claim 20 wherein each said retainer comprises a spring-biased latch member adapted to engage said corresponding engagement area of said tower portion.

23. The removable jaw assembly of claim 14 wherein said removable jaw member is constructed to be selectively removably attached to said tower portion in a first clamping orientation and a second clamping orientation.

24. The removable jaw assembly of claim 23 further comprising:

a primary angled retaining groove formed in one side of said tower portion along a first axis that is substantially transverse to said second longitudinal axis;

a first angled retaining groove formed in a first wall of said cavity configured to selectively engage said primary angled retaining groove in said tower portion when said removable jaw member is in said first clamping orientation; and a second angled retaining groove formed in a second wall of said cavity configured to selectively engage said primary angled retaining groove in said tower portion when said removable jaw member is in said second clamping orientation.

25. The removable jaw assembly of claim 24 wherein each said retainer comprises a spring-biased latch member adapted to engage said corresponding engagement area of said tower portion when said removable jaw member is in either one of said first and said second clamping orientations.

26. The removable jaw assembly of claim 25 wherein each said spring-biased latch member includes a ball member and wherein said first recess is sized relative to said corresponding ball member such that when said ball member is received therein, said removable jaw member can be vertically detached from said corresponding tower portion and wherein said second recess is sized and oriented relative to said corresponding ball member such that when said ball member engages said second recess, said removable jaw member is biased onto said worksurface and said removable jaw member is retained on said tower portion.

27. The removable jaw assembly of claim 14 wherein said tower portion comprises a portion of a movable support member that is selectively movable within a longitudinally extending slot provided in said base member towards and away from a second jaw member that is supported on said base member.

28. A workholding apparatus comprising:

a base defining a worksurface and a first longitudinal axis, said base having a slot therein that extends along said first longitudinal axis;

at least one first jaw member supported on said base;

at least one movable support member received in said longitudinal slot of said base and selectively axially movable therein, each said movable support member having a tower portion protruding above said worksurface, said tower portion having a second longitudinal axis that is substantially parallel to said first longitudinal axis;

a removable jaw member corresponding to each said movable support member and having a cavity therein sized to receive the corresponding tower portion therein, said cavity having at least one first wall defining an engagement area; and at least one retainer in each said tower portion oriented to selectively releasably engage a corresponding engagement area of said corresponding removable jaw member perpendicularly to said second longitudinal axis of said tower portion when said tower portion is received in said cavity thereof to releasably attach said corresponding removable jaw member to said tower portion.

29. The workholding apparatus of claim 28 wherein each said retainer is oriented relative to said corresponding engagement area such that when said removable jaw member is attached to said tower portion, each said retainer biases said corresponding removable jaw member onto said worksurface.

30. The workholding apparatus of claim 28 wherein each said retainer comprises a spring-biased latch member adapted to engage said corresponding engagement area in said corresponding removable jaw member.

31. The workholding apparatus of claim 30 wherein said cavity in each said removable jaw, member is sized relative to said tower portion of said corresponding movable support member such that when said tower portion is received therein, said removable jaw member can be selectively longitudinally moved from a released position wherein said removable jaw member can be vertically removed from said tower portion to an attached position wherein said removable jaw member is attached to said tower portion.

32. The workholding apparatus of claim 31 further comprising first and second recesses in each said engagement area of each said removable jaw member corresponding to each said spring-biased latch member for selective engagement therewith such that when said removable jaw member is in said released position, each said latch member engages said corresponding first recess and when said removable jaw member is moved to said attached position, each said latch member engages said corresponding second recess to attach said removable jaw member to said tower portion.

33. The workholding apparatus of claim 32 wherein each said spring-biased latch member includes a ball member and wherein said first recess is sized relative to said corresponding ball member such that when said ball member is received therein, said removable jaw member can be vertically detached from said corresponding tower portion and wherein said second recess is sized and oriented relative to said corresponding ball member such that when said ball member engages said second recess, said removable jaw member is biased onto said worksurface and said removable jaw member is retained on said tower portion.

34. The workholding apparatus of claim 28 wherein said cavity in each said removable jaw member is sized relative to said tower portion of said corresponding movable support member such that when said tower portion is received therein, said removable jaw member can be selectively longitudinally moved from a released position wherein said removable jaw member can be vertically removed from said tower portion to an attached position wherein said removable jaw member is attached to said tower portion and wherein said jaw assembly further comprises:

a first angled retaining surface formed in one side of said tower portion along a first transverse axis that is substantially transverse to said second longitudinal axis thereof; and a first angled retaining groove formed in a second wall of said cavity configured to selectively engage said first angled retaining surface in said tower portion when said removable jaw member is in said attached position.

35. The workholding apparatus of claim 34 wherein said removable jaw member has a substantially planar bottom surface and wherein said first angled retaining groove is formed at approximately a forty-five degree angle with respect to said planar bottom surface.

36. The workholding apparatus of claim 28 wherein each said removable jaw member is constructed to be selectively removably attached to said corresponding tower portion in a first clamping orientation and a second clamping orientation.

37. The workholding apparatus of claim 36 further comprising:

a first angled retaining surface formed in one side of each said tower portion along a first axis; that is substantially transverse to said second longitudinal axis;

a first angled retaining groove formed in a second wall of each said cavity configured to selectively engage said first angled retaining surface in said corresponding tower portion when said removable jaw member is in said first clamping orientation; and a second angled retaining groove formed in a third wall of each said cavity configured to selectively engage said first angled retaining surface in said corresponding tower portion when said removable jaw member is in said clamping orientation.

38. A workholding apparatus comprising:

a base defining a worksurface an d a first longitudinal axis, said base having a slot therein that extends along said first longitudinal axis;

at least one first jaw member supported on said base;

at least one movable support member received in said slot of said base and selectively axially movable therein, each said movable support member having a tower portion protruding above-said worksurface, said tower portion having a second longitudinal axis that is substantially parallel to said first longitudinal axis, each said tower portion having an angled retaining surface formed in one side thereof along a first axis that is substantially transverse to said second longitudinal axis;

a removable jaw member corresponding to each said movable support member and having a cavity therein sized to receive the corresponding tower portion therein, said cavity having a first wall having a first groove configured to selectively engage said angled retaining surface in said tower portion when said removable jaw member is in a first clamping position and a second wall having a second groove formed therein configured to selectivealy engage said angled retaining surface in said tower portion when said removable jaw member is in a second clamping position; and at least one retainer in each said tower portion oriented to selectively releasably engage a corresponding engagement area of said corresponding removable jaw member perpendicularly to said second longitudinal axis of said tower portion when said removable jaw member is in said first and second clamping positions.

39. A movable jaw support member for a workholding apparatus adapted to clamp at least one object between jaw members thereof, said workholding apparatus having a slotted base defining a first longitudinal axis; and worksurface and at least one removable jaw member having a cavity therein having at least one cavity wall defining an engagement area, said movable jaw support member comprising:

a body portion constructed to be operably supported within said slotted base;

a tower portion attached to said body portion and extending above said worksurface, said tower portion being sized to be received within said cavity in said removable jaw member; and at least one retainer in said tower portion oriented to selectively releasably engage said corresponding engagement area of said removable jaw member perpendicularly to said first longitudinal axis when said tower portion is received in said cavity to releasably attach said removable jaw member to said tower portion.

40. The movable jaw support member of claim 39 wherein each said retainer is oriented relative to said corresponding engagement area such that when said removable jaw member is attached to said tower portion, each said retainer biases said removable jaw member onto said worksurface.

41. The movable jaw support member of claim 39 wherein each said retainer comprises a spring-biased latch member adapted to engage said corresponding engagement area of said removable jaw member.

42. The movable jaw support member of claim 41 wherein said cavity in said removable jaw member is sized relative to said tower portion such that when said tower portion is received therein, said removable jaw member can be selectively longitudinally moved from a released position wherein said removable jaw member can be vertically removed from said tower portion to an attached position wherein said removable jaw member is attached to said tower portion.

43. The movable jaw support member of claim 42 further comprising first and second recesses in each said engagement area of said removable jaw member corresponding to each said spring-biased latch member for selective engagement therewith such that when said removable jaw member is in said released position, each said latch member engages said corresponding first recess and when said removable jaw member is moved to said attached position, each said latch member engages said corresponding second recess to attach said removable jaw member to said tower portion.

44. The movable jaw support member of claim 43 wherein each said spring-biased latch member includes a ball member and wherein said first recess is sized relative to said corresponding ball member such that when said ball member is received therein, said removable jaw member can be vertically detached from said corresponding tower portion and wherein said second recess is sized and oriented relative to said corresponding ball member such that when said ball member engages said second recess, said removable jaw member is biased onto said worksurface and said removable jaw member is retained on said tower portion.

45. The movable jaw support member of claim 39 wherein said cavity in said removable jaw member is sized relative to said tower portion such that when said tower portion is received therein, said removable jaw member can be selectively longitudinally moved from a released position wherein said removable jaw member can be vertically removed from said tower portion to an attached position wherein said removable jaw member is attached to said tower portion and wherein said jaw assembly further comprises:

a primary angled retaining groove formed in one side of said tower portion along a first axis that is substantially transverse to said second longitudinal axis; and a first angled retaining groove formed in another wall of said cavity configured to selectively engage said primary angled retaining groove in said jaw tower portion when said removable jaw member is in said attached position.

46. The movable jaw support member of claim 45 wherein said removable jaw member has a substantially planar bottom surface and wherein said angled retaining groove is formed at an approximate forty-five degree angle with respect to said planar bottom surface.

47. A removable jaw assembly for a workholding, apparatus having a vertically oriented base defining a worksurface and a first vertically extending longitudinal axis, comprising:

a tower portion on said workholding apparatus that protrudes outwardly from said worksurface, said tower portion having a second vertically extending longitudinal axis substantially parallel to said first vertically extending longitudinal axis;

a removable jaw member having a cavity therein sized to receive said tower portion therein such that said removable jaw member can be selectively vertically moved from a released position wherein said removable jaw member can be laterally removed from said tower portion and an attached position wherein said removable jaw member is attached to said tower portion;

at least one engagement area in a wall of said cavity and a first angled retaining groove formed in another wall of said cavity;

at least one retainer in said tower portion oriented to selectively releasably engage said engagement area of said removable jaw member perpendicularly to said second longitudinal axis when said tower portion is received in said cavity to releasably attach said removable jaw member to said tower portion, said tower portion having a primary angled retaining groove formed in one side thereof along a first axis that is substantially transverse to said second vertically extending longitudinal axis to selectively engage said first angled retaining groove in said another wall of said cavity when said removable jaw member is in said attached position; and a secondary retaining groove in said tower portion constructed to engage said removable jaw member when said removable jaw is in said released position to removably retain said removable jaw member thereon.

* * * * *